(12) United States Patent
Omori et al.

(10) Patent No.: US 12,441,179 B2
(45) Date of Patent: Oct. 14, 2025

(54) FUEL TANK

(71) Applicant: YACHIYO INDUSTRY CO., LTD., Saitama (JP)

(72) Inventors: Manabu Omori, Tochigi (JP); Masashi Suzuki, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 18/689,771

(22) PCT Filed: Aug. 23, 2022

(86) PCT No.: PCT/JP2022/031770
§ 371 (c)(1),
(2) Date: Mar. 6, 2024

(87) PCT Pub. No.: WO2023/037874
PCT Pub. Date: Mar. 16, 2023

(65) Prior Publication Data
US 2024/0326580 A1    Oct. 3, 2024

(30) Foreign Application Priority Data
Sep. 8, 2021 (JP) .................................. 2021-145991

(51) Int. Cl.
*B60K 15/03* (2006.01)

(52) U.S. Cl.
CPC .................................... *B60K 15/03* (2013.01)

(58) Field of Classification Search
CPC .......... B60K 2015/0777; B60K 15/077; B60K 15/073; B60K 15/03; B60K 2015/0344; B60K 2015/0775; B60K 2015/03032
See application file for complete search history.

(56) References Cited

U.S. PATENT DOCUMENTS 4,453,564 A * 6/1984 Bergesio ............. B29C 66/1312
137/574
4,526,286 A * 7/1985 Jung .................... B60K 15/077
220/563

(Continued)

FOREIGN PATENT DOCUMENTS

CN    104162570 A    11/2014
CN    104870165 A    8/2015

(Continued)

OTHER PUBLICATIONS

Chinese Office Action for the related Chinese Patent Application No. 202280058161.9 dated May 18, 2024.

(Continued)

*Primary Examiner* — Stephen J Castellano
(74) *Attorney, Agent, or Firm* — KENEALY VAIDYA LLP

(57) ABSTRACT

Provided is a fuel tank having recess portions serving as recess-shaped portions continuously formed from a tank main body and protruding inward. The fuel tank includes an inner pinch reducing recess portion (31) disposed on at least one side of an inner pinch generation concern region where there is a concern of an inner pinch being generated between the recess-shaped portions and a first side wall and a second side wall both of which are an upstanding wall of the tank main body. Here, the inner pinch reducing recess portion has a protrusion amount smaller than a protrusion amount of the recess-shaped portion.

4 Claims, 18 Drawing Sheets

(56) References Cited

U.S. PATENT DOCUMENTS

| | | | | |
|---|---|---|---|---|
| 5,076,703 | A | * | 12/1991 | Loefke ................ B28C 5/4213 |
| | | | | 220/563 |
| 6,357,755 | B1 | | 3/2002 | Feistel |
| 2005/0129845 | A1 | | 6/2005 | Dadalas et al. |
| 2014/0246440 | A1 | * | 9/2014 | Kopiec ................ B60K 13/04 |
| | | | | 220/563 |
| 2015/0061322 | A1 | | 3/2015 | Tamada et al. |
| 2015/0217635 | A1 | | 8/2015 | Nakane et al. |
| 2015/0328824 | A1 | | 11/2015 | Morikami et al. |
| 2018/0346766 | A1 | | 12/2018 | Mihara et al. |
| 2019/0016928 | A1 | | 1/2019 | Mihara et al. |
| 2019/0255936 | A1 | * | 8/2019 | Tanaka ................ B32B 3/266 |

FOREIGN PATENT DOCUMENTS

| | | |
|---|---|---|
| CN | 210738710 U | 6/2020 |
| DE | 10351279 A1 | 6/2005 |
| EP | 0633422 A1 | 1/1995 |
| JP | H05-029828 U | 4/1993 |
| JP | 2011-93409 A | 5/2011 |
| JP | 2013-217413 A | 10/2013 |
| JP | 2015-63231 A | 4/2015 |
| WO | 2012/042615 A1 | 4/2012 |

OTHER PUBLICATIONS

Written Opinion dated on Nov. 8, 2022 for PCT/JP2022/031770.
International Search Report dated Nov. 8, 2022 for PCT/JP2022/031770.
International Preliminary Report on Patentability dated Oct. 10, 2023 for PCT/JP2022/031770.
German Office Action for the related German Patent Application No. 112022003356.8 dated May 27, 2025.

* cited by examiner

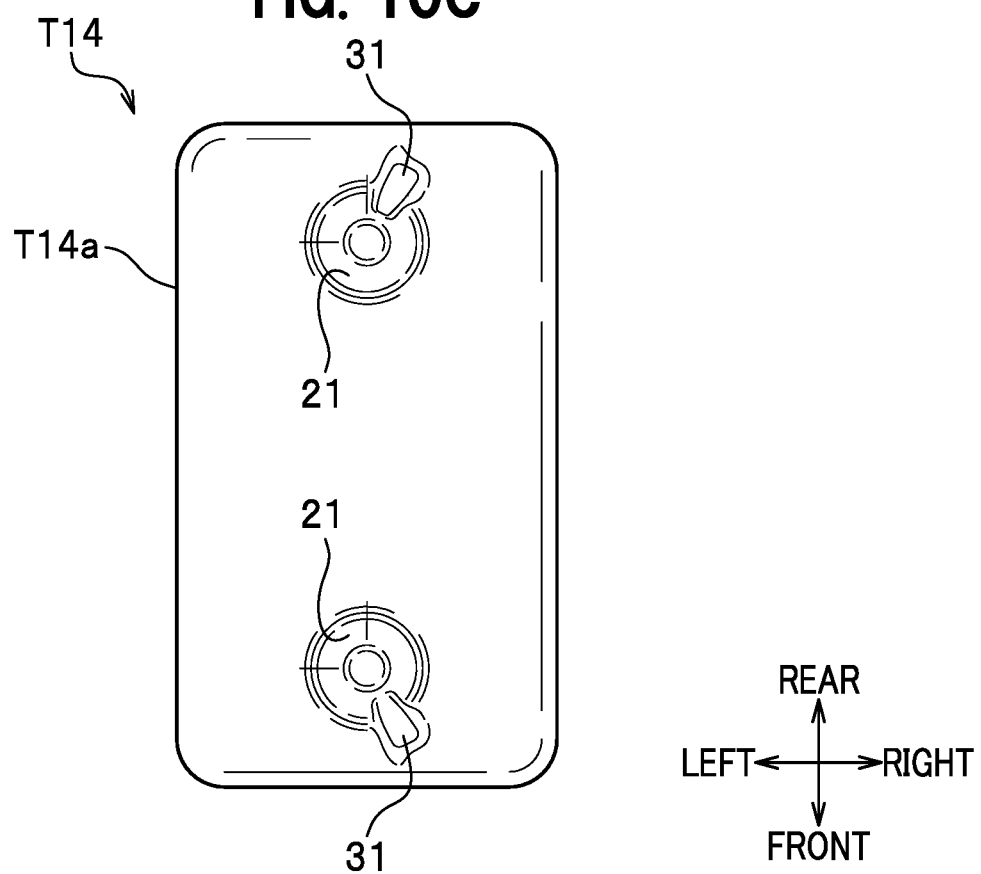

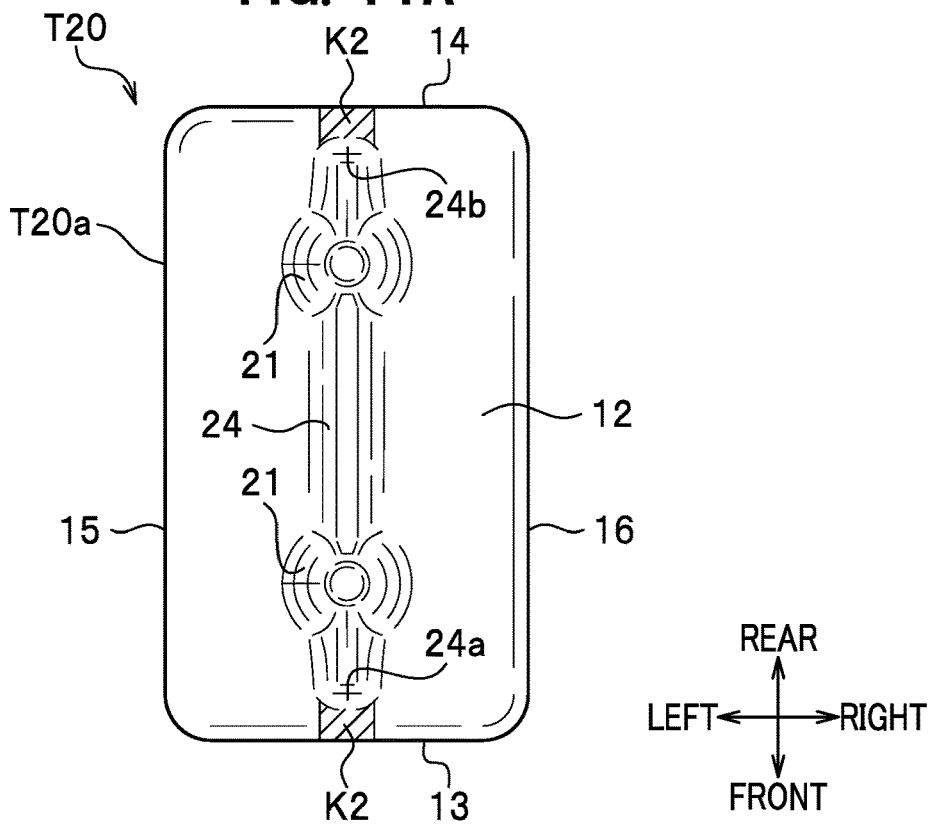
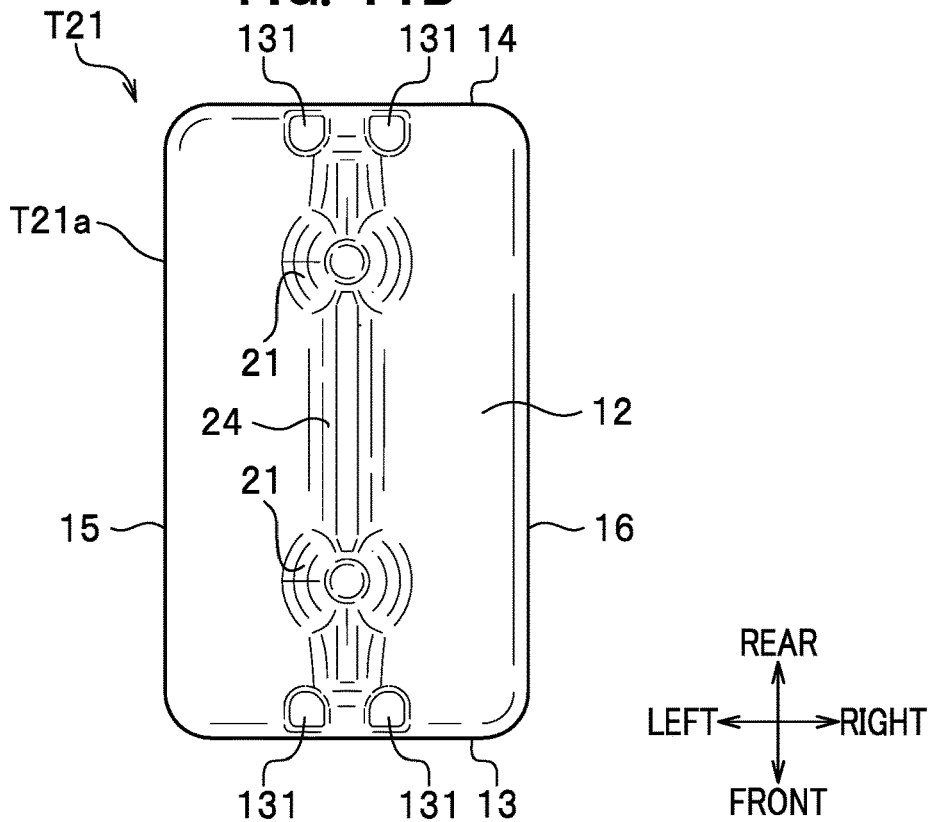

FUEL TANK

CROSS-REFERENCE TO RELATED APPLICATION

This application U.S. National Stage Application under 35 U.S.C. § 371 of International Patent Application No. PCT/JP2022/031770 filed on Aug. 23, 2022, which claims the benefit of priority to Japanese Patent Application No. 2021-145991 filed on Sep. 8, 2021, the disclosures of all of which are hereby incorporated by reference in their entireties.

TECHNICAL FIELD

The present invention relates to a fuel tank.

BACKGROUND ART

A fuel tank for an automobile is known, provided with a recess portion recessed into a tank main body. For example, Patent Document 1 describes a fuel tank having recess portions formed at an upper surface and a lower surface of a tank main body and recessed into the tank main body until bottom walls of the recess portion at the upper surface and the recess portion at the lower surface are joined to each other (i.e., a fuel tank having an abutment portion). With the configuration described above, a fuel tank can be increased in rigidity without, for example, increasing the thickness of the tank walls.

There is also known a fuel tank provided with a recess portion recessed into a tank main body in a linear or curving manner (also called a bead-shaped portion). Having the bead-shaped portion helps control the flow of a fuel to prevent the fuel from generating rippling sound and also helps reduce deformation of the tank main body.

CITATION LIST

Patent Document

Patent Document 1: JP-U Hei 5-029828

SUMMARY OF INVENTION

Technical Problem

If a recess-shaped portion, such as the abutment portion or the bead-shaped portion, is close in distance to an upstanding wall forming the tank main body, there is a risk that an inner pinch (i.e., a protrusion on the inner surface) is generated between the recess-shaped portion and the upstanding wall. The inner pinch is thought to be generated as a result of a parison being unable to blow up favorably due to the presence of a factor hindering the parison from expanding.

If an inner pinch is generated, it may cause the flow of a fuel to be blocked at an unintended location or may serve as a starting point of a crack due to an external force or the tank's internal pressure. For these reasons, for example, the generation of an inner pinch has heretofore been prevented by leaving a sufficient distance between the recess-shaped portion and the upstanding wall. However, the method described above is problematic in the sense that freedom in design would be restricted.

The present invention has been made in view of the above and has an object to provide a fuel tank that prevents generation of an inner pinch and offers more freedom in design.

Solution to Problem

To achieve the above object, the present invention is intended to provide a fuel tank having a recess-shaped portion formed continuously from a tank main body and protruding inwards, the fuel tank including an inner pinch reducing recess portion being disposed on at least one side of an inner pinch generation concern region where there is a concern of an inner pinch being generated when molding between the recess-shaped portion and an upstanding wall of the tank main body or between two of the recess-shaped portions. Herein, the inner pinch reducing recess portion has a protrusion amount smaller than a protrusion amount of the above recessed-shaped portion.

With the inner pinch reducing recess portion, the present invention can prevent generation of an inner pinch and allow more freedom in design.

Also, it is preferable that the recess-shaped portion be, for example, a recess portion forming an abutment portion formed by recessing facing wall portions and joining their bottom portions to each other or a bead-shaped portion formed with an intension of wave dissipation or deformation reduction.

Also, it is preferable that the inner pinch reducing recess portion be disposed at both sides of the inner pinch generation concern region. This enables well-balanced reduction of generation of an inner pinch.

Advantageous Effects of Invention

The fuel tank of the present invention can prevent generation of an inner pinch and offer more freedom in design.

BRIEF DESCRIPTION OF DRAWINGS

FIG. 10C is a plan view of a fuel tank according to a third modification of the first embodiment.

FIG. 11A is a plan view of a fuel tank of a comparative example for a second embodiment.

FIG. 11B is a plan view of a fuel tank according to the second embodiment.

DESCRIPTION OF EMBODIMENTS

Figure 1A:
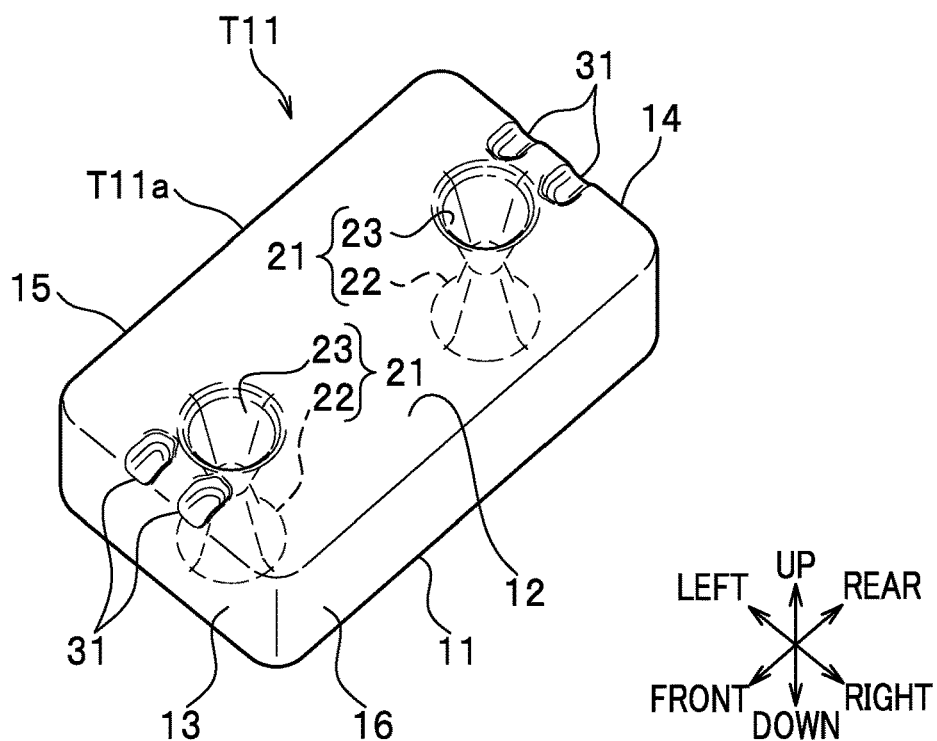
FIG. 1A is a perspective view of a fuel tank according to a first embodiment of the present invention.

<<Fuel Tank According to a First Embodiment>>

A fuel tank T11 according to a first embodiment is described with reference to FIGS. 1A to 1C. The fuel tank T11 is mounted on transportation means such as an automobile, a motorcycle, or a vessel, and is formed mainly of a tank main body T11a. The fuel tank T11 may include an integral component (not shown) in addition to the tank main body T11a. Examples of the integral component include a reinforcement member, a valve, and a wave-dissipating plate. Directions "up and down," "front and rear," and "right and left" used for the description of the fuel tank T11 are as indicated by the arrows in FIG. 1A. These directions are defined for the purpose of illustration and are not intended to limit the present invention. Note that the up-down direction in FIG. 1A corresponds to the direction in which a pair of molds for manufacturing the fuel tank T11 are closed and opened.

The tank main body T11a is a hollow container made of resin and configured to store a fuel such as gasoline and has a multi-layer structure including a barrier layer. The main material for the tank main body T11a is, for example, a thermoplastic resin such as polyethylene or high density polyethylene. The tank main body T11a is formed by, for example, blow molding.

The tank main body T11a is formed by a lower wall 11, an upper wall 12, and a plurality of upstanding walls (i.e., a first sidewall 13 at the front, a second sidewall 14 at the rear, a third sidewall 15 at the left, and a fourth sidewall 16 at the right). Note that the lower wall 11, the upper wall 12, the first sidewall 13, the second sidewall 14, the third sidewall 15, and the fourth sidewall 16 may be collectively referred to as "wall portions."

Figure 1B:
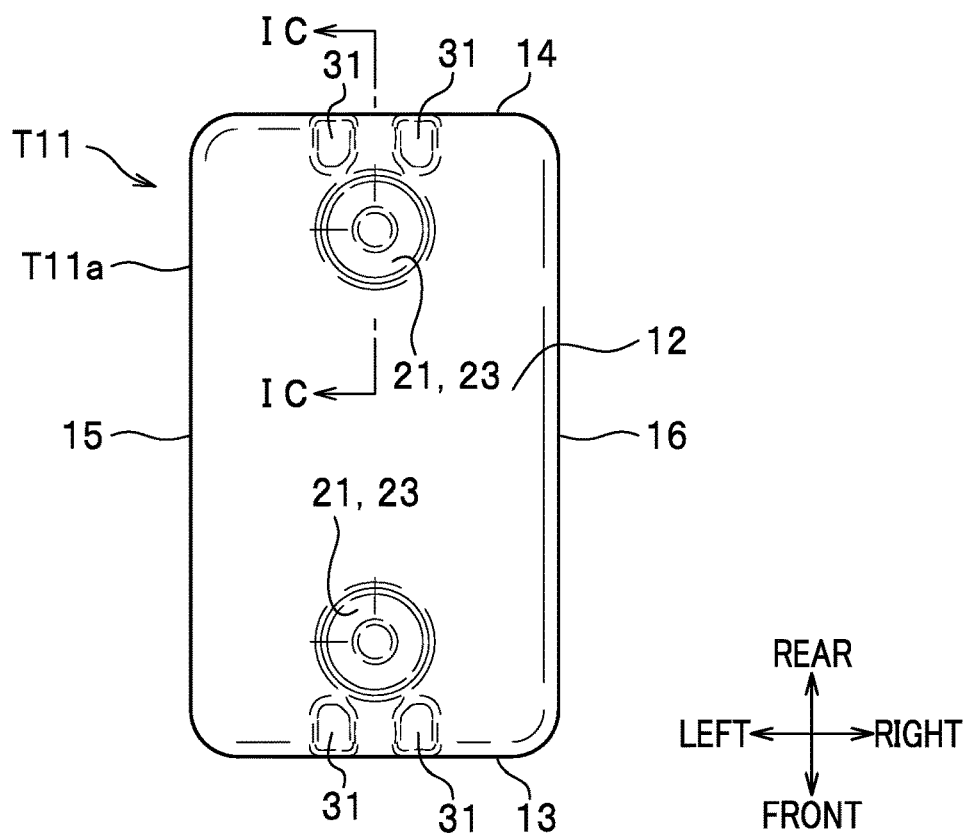
FIG. 1B is a plan view of the fuel tank according to the first embodiment of the present invention.
Figure 1C:
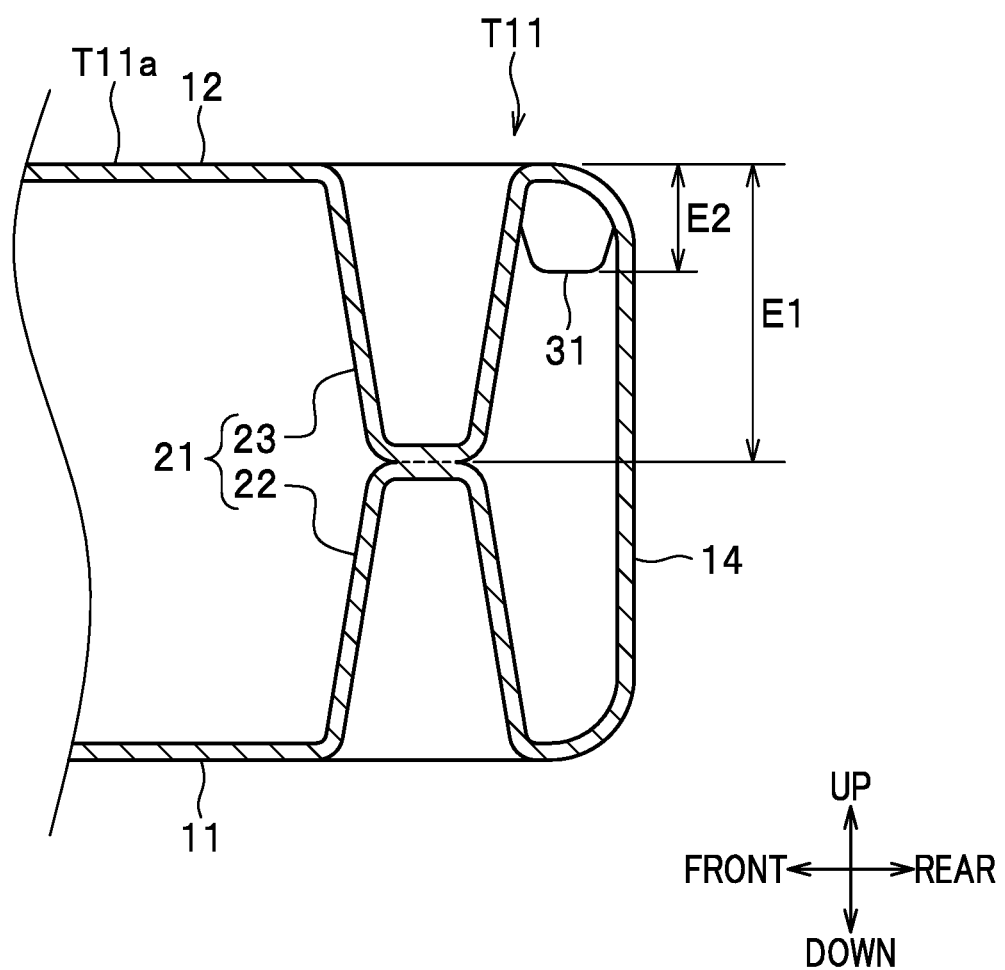
FIG. 1C is a sectional view taken along a line IC-IC in FIG. 1B.

As shown in FIGS. 1A and 1B, two abutment portions 21 are formed in the tank main body T11a. The abutment portions 21 are each a part where wall portions facing each other are recessed until their bottom surfaces join to each other, forming a columnar shape. Specifically, as shown in FIG. 1C, the abutment portions 21 are each formed by two facing recess portions 22, 23. The recess portion 22 is formed at the lower wall 11 and has a shape such that the lower wall 11 is recessed inwards (i.e., upwards). The recess portion 23 is formed at the upper wall 12 and has a shape such that the upper wall 12 is recessed inwards (i.e., downwards).

The recess portions 22, 23 have the same shape and have, for example, mirror symmetry in the up-down direction. The recess portions 22, 23 are circular in a sectional view orthogonal to the up-down direction, and the inner diameters thereof become smaller in the depth direction. In other words, the recess portions 22, 23 are tapered in the depth direction. The bottom portion of the recess portion 22 and the bottom portion of the recess portion 23 are joined (i.e., bonded) to each other.

In the present embodiment, as shown in FIG. 1B, the abutment portions 21, 21 are disposed close to the first sidewall 13 and the second sidewall 14, respectively. The recess portions 22, 23 are formed by transfer of the shapes of abutment mold portions 2j, 3j provided at mold surfaces 2a, 3a of molds 2, 3 (see FIG. 8) at the time of blow molding. Note that the recess portions 22, 23 forming the abutment portion 21 are an example of the "recess-shaped portion." Although two abutment portions 21 are provided in the present embodiment, it is to be noted that one or three or more abutment portions 21 may be provided.

At least one inner pinch reducing recess portion 31 (e.g., four portions in FIGS. 1A and 1B) is formed in the tank main body T11a. The inner pinch reducing recess portion 31 is a part provided to reduce generation of an inner pinch. The inner pinch reducing recess portion 31 is disposed on at least one of the right and left sides of an inner pinch generation concern region K1 (see FIG. 2B) where there is a concern of an inner pinch being generated. A size and a shape of the inner pinch reducing recess portion 31 are not limited to particular ones as long as the size and shape offer advantageous effects of reducing generation of an inner pinch.

As shown in FIG. 1A, the inner pinch reducing recess portions 31 of the present embodiment are formed at the upper wall 12 and have a shape such that the upper wall 12 is recessed inwards (i.e., downwards). A protrusion amount E2 by which the inner pinch reducing recess portions 31 protrude into the tank main body T11a (see FIG. 1C) is smaller than a protrusion amount E1 by which the recess portions 22, 23 protrude. In other words, the depth of the inner pinch reducing recess portions 31 is shallower than the depth of the recess portions 22, 23.

The inner pinch reducing recess portion 31 is formed in correspondence to an inner pinch reducing bump portion 2k (see FIG. 8) formed at the mold, and is formed by transfer of the shape of the inner pinch reducing bump portion 2k at the time of blow molding.

Figure 2A:
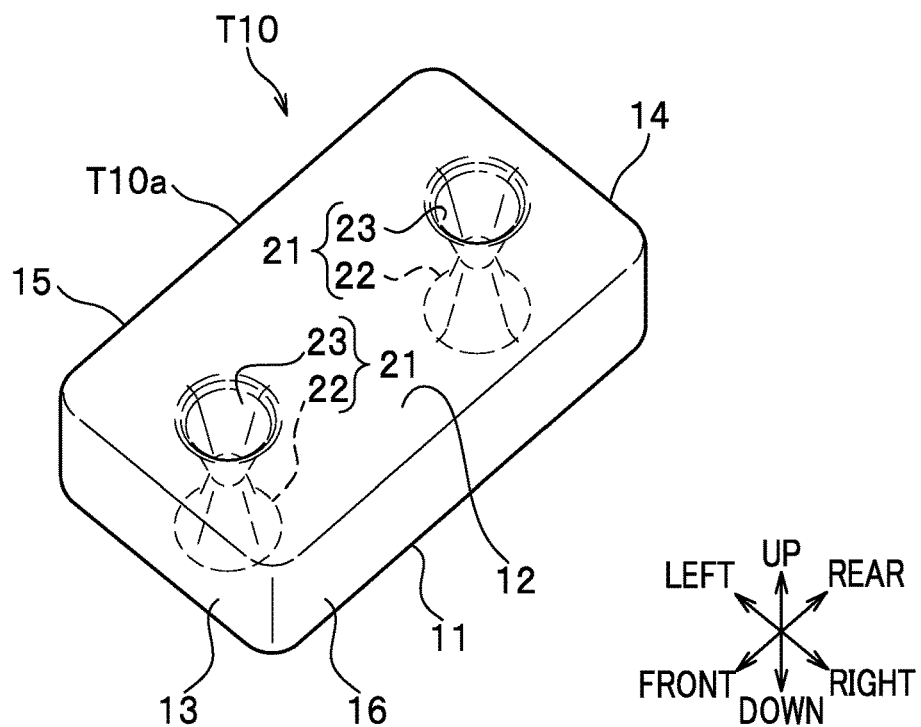
FIG. 2A is a perspective view of a fuel tank of a comparative example which has no inner pinch reducing recess portion.
Figure 2B:
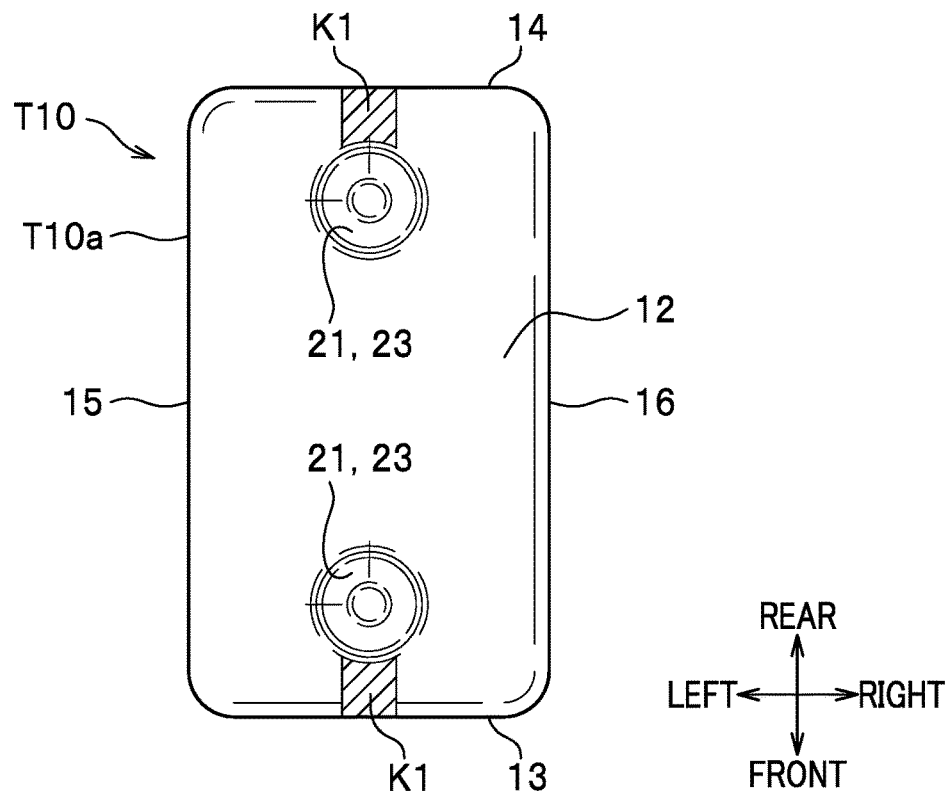
FIG. 2B is a plan view of the fuel tank of the comparative example which has no inner pinch reducing recess portion.

Here, generation of an inner pinch is described with reference to FIGS. 2A to 7. Assumed here is a case where a fuel tank T10 shown in FIGS. 2A and 2B is manufactured by blow molding. The fuel tank T10 shown in FIGS. 2A and 2B is the fuel tank T11 shown in FIG. 1A without the inner pinch reducing recess portions 31. Thus, a tank main body T10a has the abutment portions 21 but does not have the inner pinch reducing recess portions 31. The abutment portions 21 are disposed at positions close to the first sidewall 13 and the second sidewall 14, respectively. The tank main body T10a has the inner pinch generation concern regions K1 where there is a concern of an inner pinch being generated.

Figure 3:
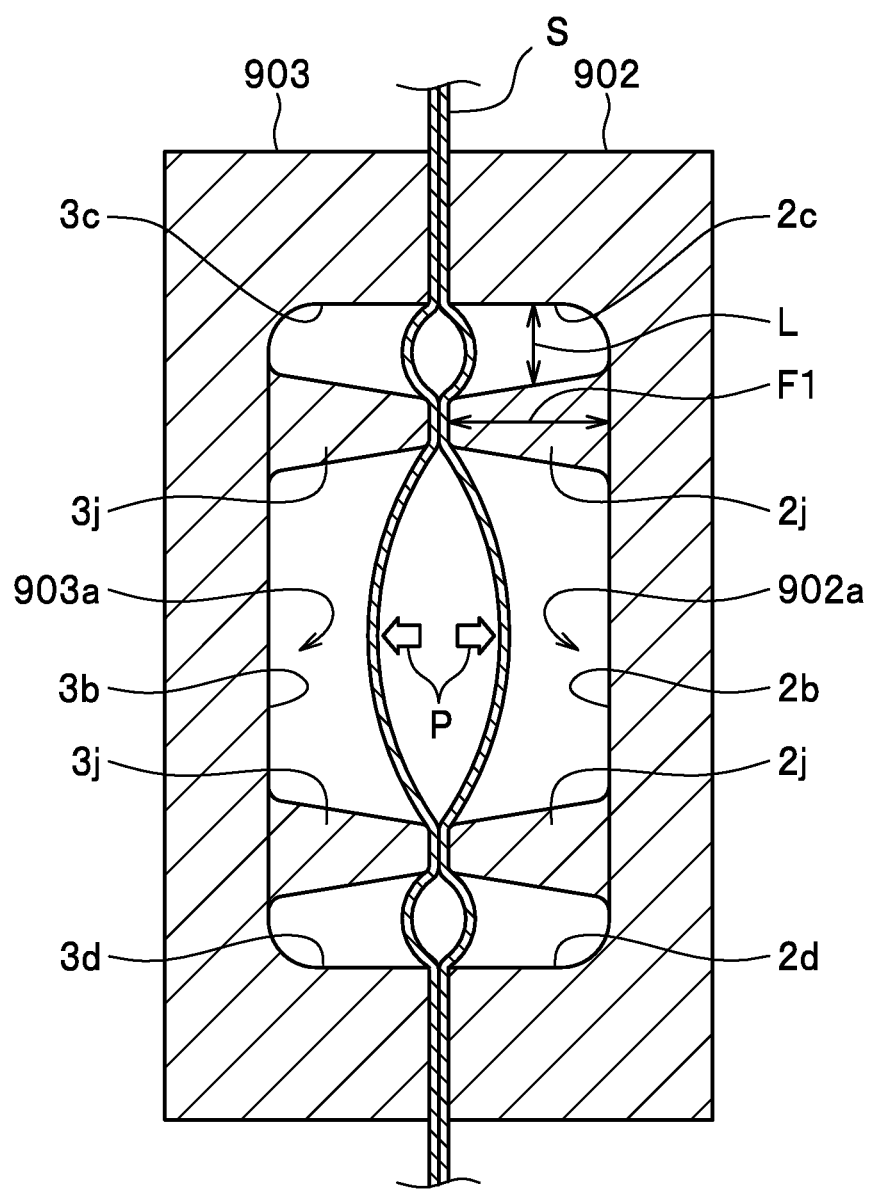
FIG. 3 is a diagram illustrating a state where the fuel tank of the comparative example is being formed by blow molding.
Figure 4:
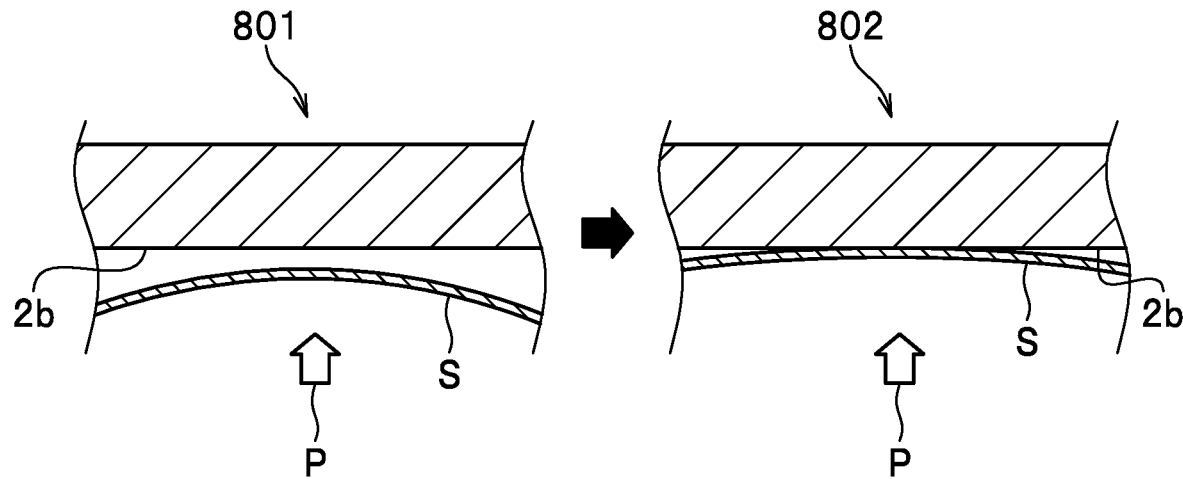
FIG. 4 is an image diagram showing a state where a parison is blown up in the absence of an abutment mold portion.

FIG. 3 shows a state where the fuel tank T10 is being formed by blow molding. The fuel tank T10 is formed by clamping a pair of molds 902, 903 with a tubular or sheet-shaped parison S disposed therebetween and then supplying air inside so that the shapes of mold surfaces 902a, 903a of the molds 902, 903 are transferred to the parison S. FIG. 3 shows the blow pressure with open arrows denoted by reference sign P. The parison S shown in FIG. 3 is in a process of being blown up.

The mold surface 902a of the mold 902 has a first mold portion 2b, a second mold portion 2c, and a third mold portion 2d. The first mold portion 2b is a part for forming the upper wall 12 of the tank main body T10a, the second mold portion 2c is a part for forming the first sidewall 13 at the front of the tank main body T10a, and the third mold portion 2d is a part for forming the second sidewall 14 at the rear of the tank main body T10a. Similarly, the mold surface 903a of the mold 903 has a first mold portion 3b, a second mold portion 3c, and a third mold portion 3d. The first mold portion 3b is a part for forming the lower wall 11 of the tank main body T10a, the second mold portion 3c is a part for forming the first sidewall 13 at the front of the tank main body T10a, and the third mold portion 3d is a part for forming the second sidewall 14 at the rear of the tank main body T10a.

Two abutment mold portions 2j are formed at the mold surface 902a of the mold 902 to form the recessed portions 23 at the upper wall 12. The abutment mold portions 2j are formed protruding in a clamping direction of the molds 902, 903. For example, the abutment mold portion 2j on the second mold portion 2c side has a short distance L to the second mold portion 2c, and a protrusion amount F1 in the clamping direction has a height equivalent to that of the second mold portion 2c. Similarly, the abutment mold portion 2j on the third mold portion 2d side has a short distance to the third mold portion 2d and has a height equivalent thereto. Also, two abutment mold portions 3j are formed at the mold surface 903a of the mold 903 to form the recess portions 22 of the lower wall 11.

How the parison S is blown up is described, focusing on the abutment mold portion 2j at a side of the second mold portion 2c. As indicated with reference numeral 801 in FIG. 4, if the parison S is blown up in the absence of the abutment mold portion 2j, the parison S is blown up favorably, and the shape of the first mold portion 2b is transferred without the parison S bending, as indicated with reference numeral 802.

Figure 5:
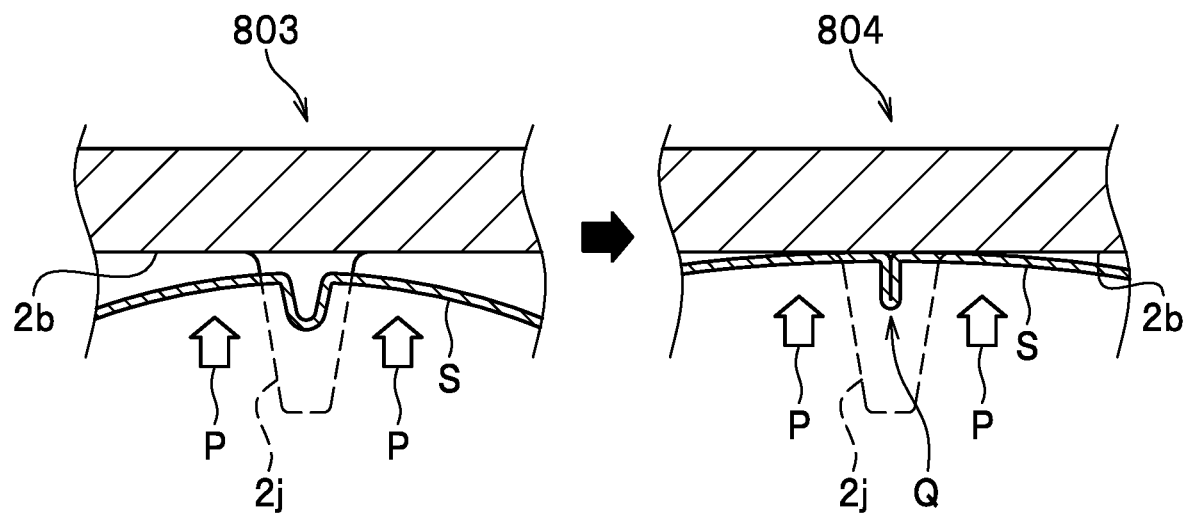
FIG. 5 is an image diagram showing a state where a parison is blown up in the presence of an abutment mold portion.

By contrast, as indicated with reference numeral 803 in FIG. 5, if the parison S is blown up in the presence of the abutment mold portion 2j, the abutment mold portion 2j acts as a factor (i.e., a starting point) to hinder the parison S from expanding, so that the parison S cannot blow up favorably and bends into the tank. Then, as shown with reference numeral 804, an inner pinch Q is formed by the outer layer of the parison S attaching to each other, upstanding from the wall portion. Although depending on the conditions, for example, the inner pinch Q is formed linearly from the starting point that hinders the parison S from expanding (here, the abutment mold portion 2j) to the upstanding wall. If there are two starting points hindering the parison S from expanding, the inner pinch Q tends to be generated in such a manner as to connect the starting points.

Figure 6:
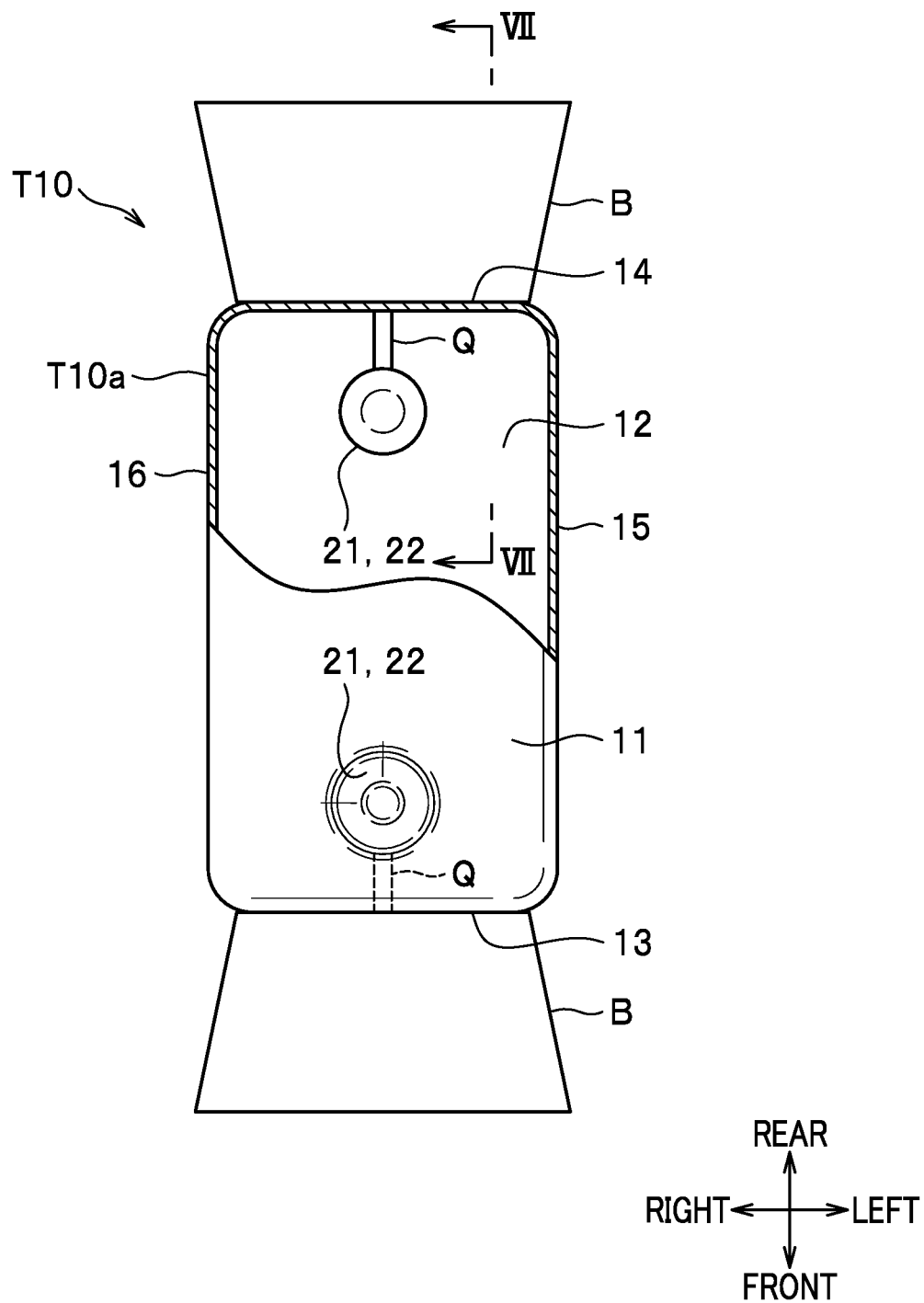
FIG. 6 is a bottom view of a fuel tank (which has just been demolded) of a comparative example which has no inner pinch reducing recess portion and shows the inside of the tank main body by removing a part of a lower wall.
Figure 7:
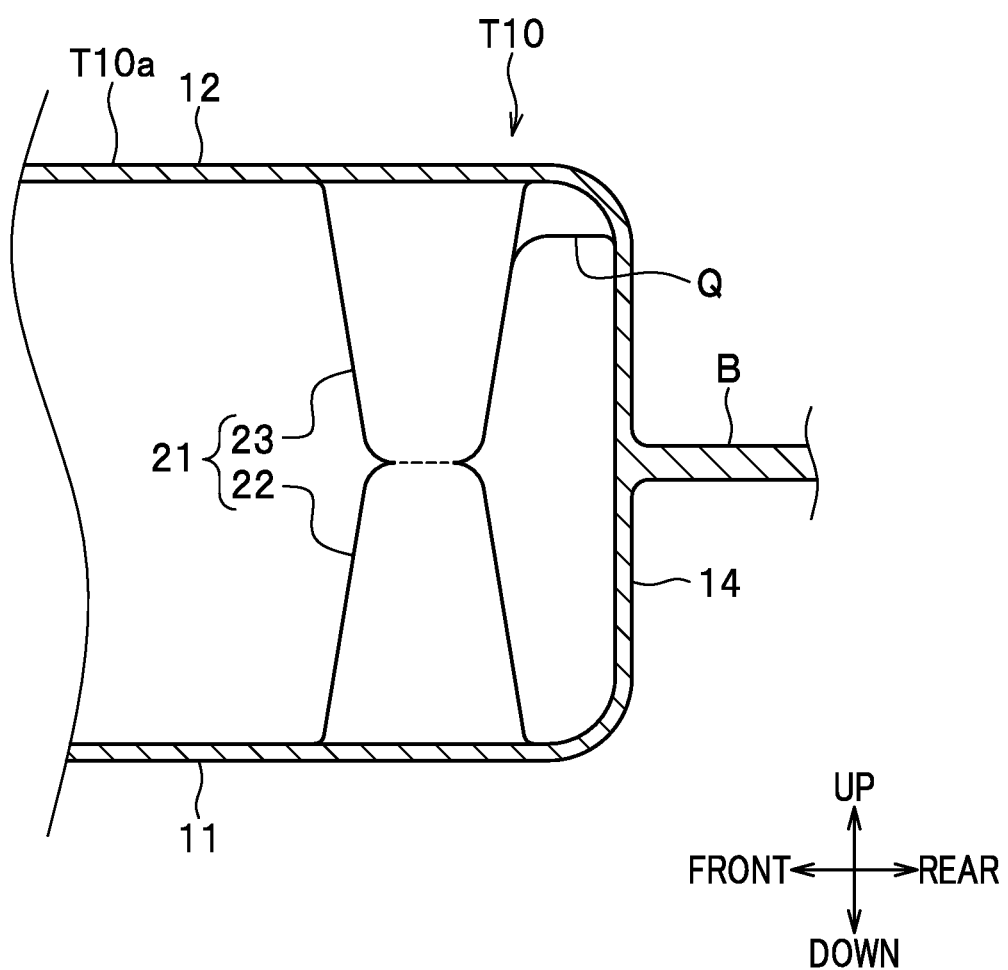
FIG. 7 is a sectional view taken along a line VII-VII in FIG. 6.

FIGS. 6 and 7 show the tank main body T10a which has just been demolded. FIG. 6 is a bottom view of the tank main body T10a and shows the inside of the tank main body T10a by removing a part of the lower wall 11. FIG. 7 is a sectional view of taken along a line VII-VII in FIG. 6. Burrs B are formed at the tank main body T10a which has just been demolded, and the inner pinch Q is formed in such a manner as to connect the abutment portion 21 to the second sidewall 14 at the rear. Similarly, another inner pinch Q is formed between the abutment portion 21 and the first sidewall 13 at the front.

The inner pinch Q shown in FIGS. 6 and 7 is easily generated when the depth of the recess portions 22, 23 of the abutment portion 21 is deep and when a distance between the abutment portion 21 and the upstanding wall is close (the upstanding wall including the first sidewall 13 at the front, the rear second sidewall 14 at the rear, the third sidewall 15 at the left, and the fourth sidewall 16 at the right). Here, since one of the abutment portions 21 is close to the second sidewall 14 in distance, it is likely that the inner pinch Q is generated between the abutment portion 21 and the second sidewall 14. The same goes for the relation between the abutment portion 21 and the first sidewall 13. In other words, as shown in FIG. 2B, a region between one of the abutment portions 21 and the second sidewall 14 and a region between the other one of the abutment portions 21 and the first sidewall 13 are the inner pinch generation concern regions K1 where there is a concern of the inner pinch Q being generated. For this reason, as shown in FIG. 1B, the fuel tank T11 of the present embodiment is provided with the inner pinch reducing recess portions 31 on the right and left sides of each inner pinch generation concern region K1 (see FIG. 2B) to reduce generation of the inner pinches Q.

<<Method for Manufacturing the Fuel Tank According to the First Embodiment>>

Next, a method for manufacturing the fuel tank T11 (see FIG. 1A) according to the first embodiment is described with reference to FIGS. 8 to 9B (and to FIGS. 1A to 7 as needed). A manufacturing process for the fuel tank T11 is formed by a plurality of steps including a tank main body molding step.

Figure 8:
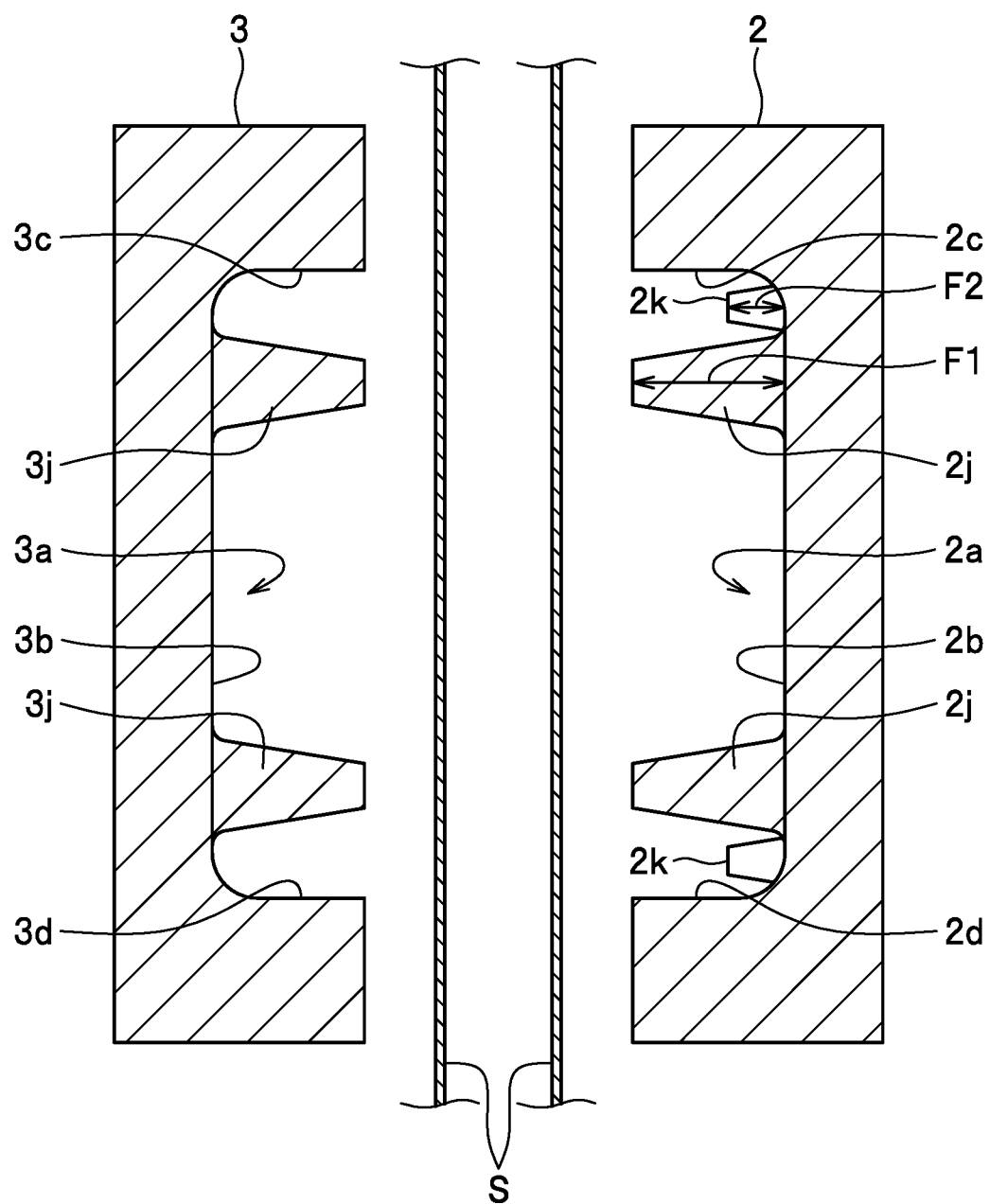
FIG. 8 is a longitudinal sectional view of a manufacturing apparatus (molds in particular) used to manufacture the fuel tank according to the first embodiment.

The tank main body molding step is a step of blow molding the tank main body T11a (see FIG. 1A) with the molds 2, 3 shown in FIG. 8. In the tank main body molding step, the tubular or sheet-shaped parison S is ejected in between the pair of molds 2, 3 from a die (not shown). The parison S is thermoplastic resin formed of a plurality of layers including a barrier layer inside and has a multi-layered cross sectional structure formed by, for example, HDPE (high-density polyethylene), EVOH (ethylene vinyl alcohol copolymer), an adhesive layer, and the like. The molds 2, 3 are heated in advance to a predetermined temperature in order to allow the parison S to plastically deform. Then, the molds 2, 3 are clamped, and air is supplied thereinto. As a result, the shapes of the mold surfaces 2a, 3a of the molds 2, 3 are transferred to the parison S. Note that the shapes of the molds 2, 3 may be transferred to the parison S by suction of the parison S using vacuuming means provided at the molds 2, 3. After a predetermined period of time passes, the molds are removed, and then unwanted burrs are cut off. The tank main body T11a is thus completed.

A pair of molds 2, 3 shown in FIG. 8 are added with the inner pinch reducing bump portions 2k to the mold 902 shown in FIG. 3, and are the same as the molds 902, 903 in other configurations. The inner pinch reducing bump portion 2k is provided on at least one of the right and left sides (here, both at the right and left sides) of each inner pinch generation concern region K1 (see FIG. 2B). A protrusion amount F2 by which the inner pinch reducing bump portion 2k protrudes in the clamping direction is smaller than the protrusion amount F1 by which the abutment mold portion 2j protrudes.

Figure 9A:
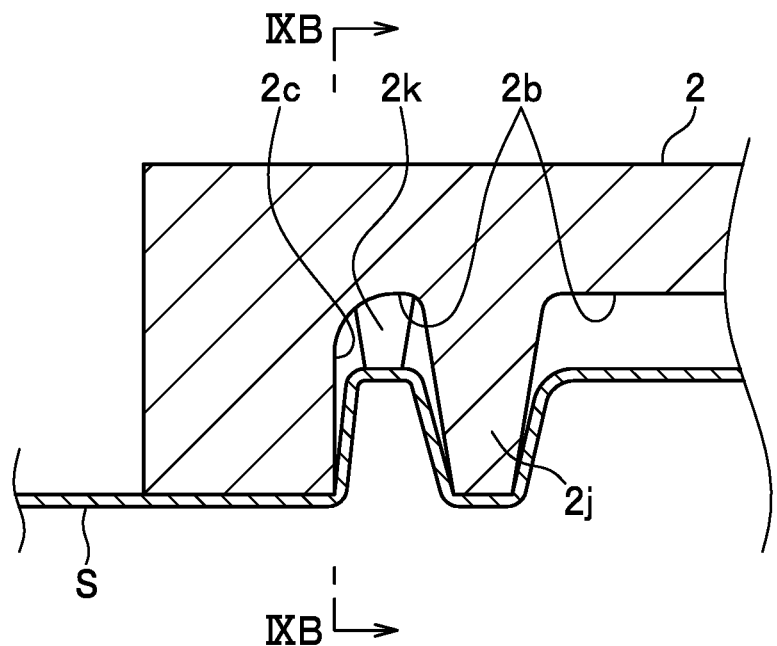
FIG. 9A is an enlarged sectional view of an area around the abutment mold portion to illustrate how the shape of a mold surface of the mold is transferred.
Figure 9B:
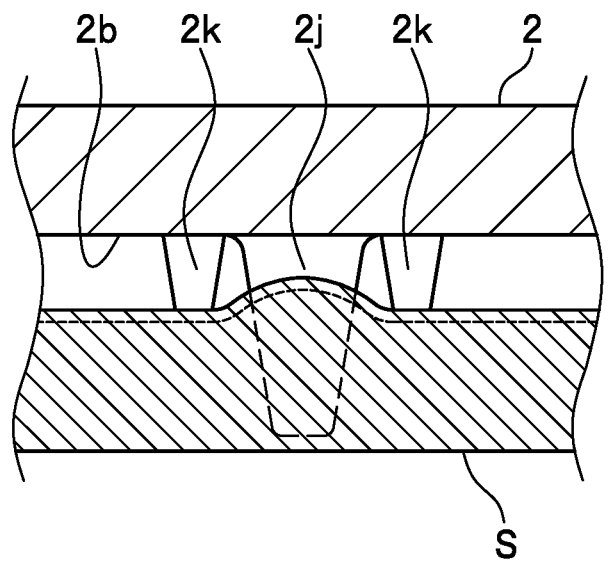
FIG. 9B is a sectional view taken along a line IXB-IXB in FIG. 9A to illustrate how the shape of the mold surface of the mold is transferred.

With reference to FIGS. 9A and 9B, a description is given of how the shape of the mold surface 2a of the mold 2 is transferred. FIG. 9A is an enlarged sectional view of an area around the abutment mold portion 2j on the second mold portion 2c side, and FIG. 9B is a sectional view of taken along a line IXB-IXB in FIG. 9A.

As shown in FIG. 9A, because the inner pinch reducing bump portion 2k which is lower in height than the abutment mold portion 2j is provided, the parison S, when being blown up, comes into contact with the inner pinch reducing bump portion 2k before coming into contact with the first mold portion 2b. In other words, the inner pinch reducing bump portion 2k functions as a foremost-abutment shape with which the parison S, when being blown up, comes into contact first before it comes into contact with the first mold portion 2b. Thus, as shown in FIG. 9B, the inner pinch reducing bump portion 2k gives bulginess to the parison S and makes it less likely for the parison S to bend into the tank, thereby reducing generation of the inner pinch Q.

According to the first embodiment described above, the inner pinch reducing recess portions 31 are provided at both the right and left sides of each of the inner pinch generation concern regions K1 (see FIG. 2B) existing between the abutment portion 21 and the first sidewall 13 at the front and between the abutment portion 21 and the second sidewall 14 at the rear. This configuration helps reduce generation of the inner pinch Q. Also, according to the present embodiment, there are no longer constraints as to the position, shape, height, and the like of the abutment portion 21, and thus, more freedom in design can be offered.

Modifications of the First Embodiment

Figure 10A:
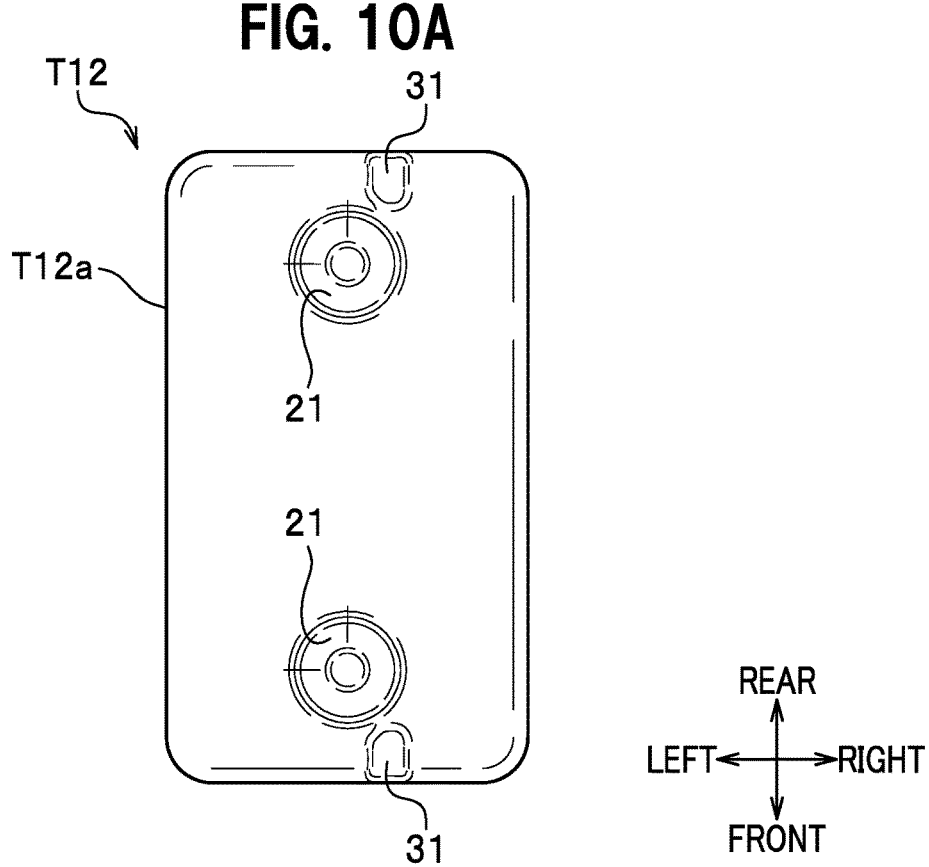
FIG. 10A is a plan view of a fuel tank according to a first modification of the first embodiment.
Figure 10B:
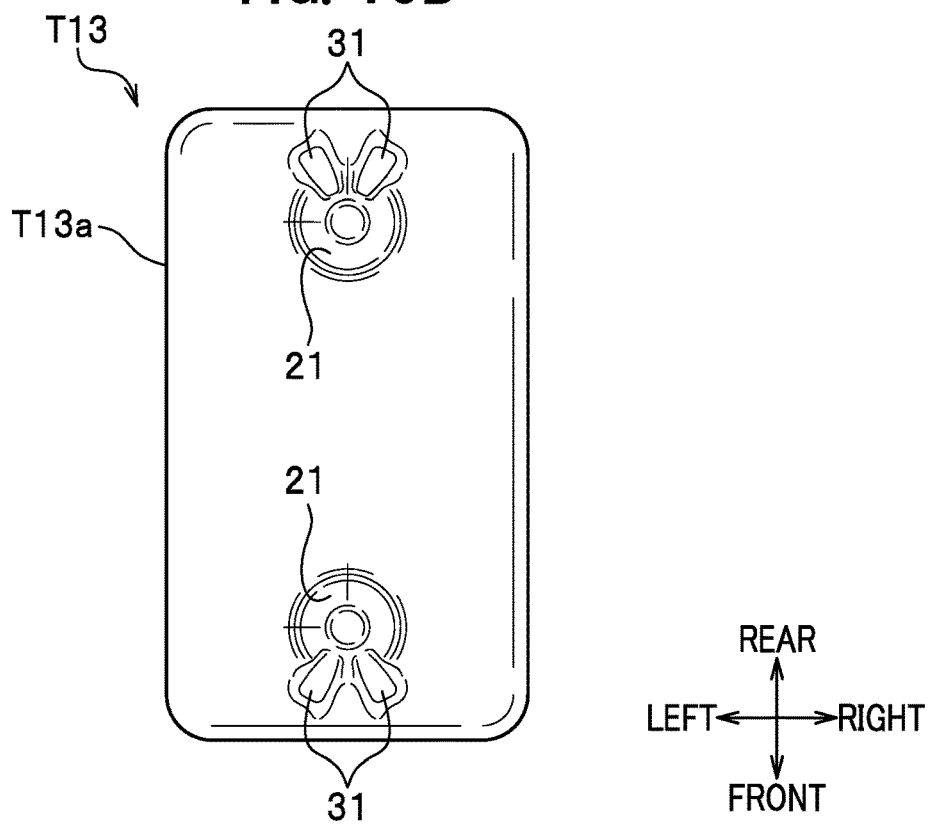
FIG. 10B is a plan view of a fuel tank according to a second modification of the first embodiment.

In the first embodiment, the inner pinch reducing recess portions 31 are provided at both sides of the inner pinch generation concern regions K1 (see FIG. 2B), assuming that the inner pinch generation concern regions K1 are generated between the abutment portion 21 and the first sidewall 13 at the front and between the abutment portion 21 and the second sidewall 14 at the rear. However, like a fuel tank T12 shown in FIG. 10A, a tank main body T12a may include the inner pinch reducing recess portions 31 only at one sides of the inner pinch generation concern regions K1. This configuration also offers advantageous effects of reducing generation of the inner pinch Q. Also, like a fuel tank T13 (a tank main body T13a) shown in FIG. 10B, the inner pinch reducing recess portions 31 may partially overlap with the abutment portions 21. In such a case as well, as shown in FIG. 10C, the inner pinch reducing recess portions 31 can be disposed at only one side of the inner pinch generation concern regions K1.

<<Fuel Tank According to a Second Embodiment>>

As the structure of a fuel tank in a comparative example, the first embodiment assumes the one shown in FIGS. 2A and 2B. Specifically, two abutment portions 21 are formed at the upper wall 12 of the tank main body T10a of the fuel tank T10 in the comparative example, arranged side by side in the front-rear direction and disposed close to the first sidewall 13 and the second sidewall 14, respectively.

As the structure of a fuel tank in a comparative example, a second embodiment assumes the one shown in FIG. 11A. Specifically, two abutment portions 21 arranged side by side in the front-rear direction and a bead-shaped portion 24 extending in the front-rear direction in such a manner as to penetrate through the two abutment portions 21, 21 are formed at the upper wall 12 of a tank main body T20a of a fuel tank T20 in a comparative example. The bead-shaped portion 24 is a portion formed by recessing the wall portion linearly and is shaped like a groove. The bead-shaped portion 24 may include a curved part. The bead-shaped portion 24 is rectangular (or substantially rectangular with round corners) in a cross section orthogonal to the up-down direction, and the width of the rectangle becomes narrower as it gets deeper in the depth direction. In other words, the bead-shaped portion 24 is tapered as it gets deeper in the depth direction. The bead-shaped portion 24 is not in contact with the lower wall 11. The bead-shaped portion 24 is an example of the "recess-shaped portion."

A front end portion 24a of the bead-shaped portion 24 extends close to the first sidewall 13 at the front, and a rear end portion 24b extends close to the second sidewall 14 at the rear. In the tank main body T20a, a region between the front end portion 24a of the bead-shaped portion 24 and the first sidewall 13 and a region between the rear end portion 24b and the second sidewall 14 are inner pinch generation concern regions K2 where there is a concern of the inner pinch Q being generated. Specifically, the bead-shaped portion 24 (i.e., a protruding portion of the mold corresponding to the bead-shaped portion 24) serves as a starting point hindering the parison S from expanding, and therefore, the inner pinch Q is generated due to the same principle as the first embodiment.

As shown in FIG. 11B, in order to reduce generation of the inner pinch Q, a fuel tank T21 of the present embodiment is provided with inner pinch reducing recess portions 131 at both the right and left sides of each of the inner pinch generation concern regions K2 (see FIG. 11A). The protrusion amount by which the inner pinch reducing recess portions 131 protrude into a tank main body T21a is smaller than the protrusion amount by which the bead-shaped portion 24 protrudes. In other words, the depth of the inner pinch reducing recess portions 131 is shallower than the depth of the bead-shaped portion 24. Note that the inner pinch reducing recess portions 131 may be disposed at only one side of the inner pinch generation concern regions K2, like in the modification of the first embodiment.

The fuel tank T21 according to the second embodiment described above offers the same advantageous effects as the fuel tank T11 according to the first embodiment.

<<Fuel Tank According to a Third Embodiment>>

Figure 12A:
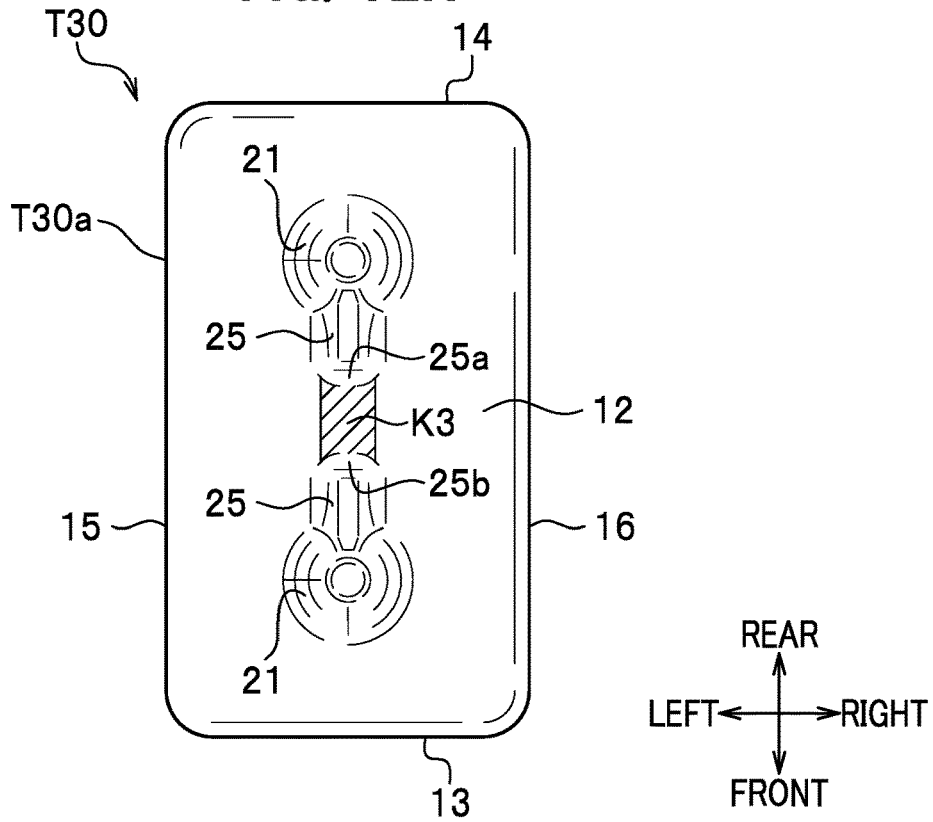
FIG. 12A is a plan view of a fuel tank of a comparative example for a third embodiment.

As the structure of a fuel tank in a comparative example, a third embodiment assumes the one shown in FIG. 12A. Specifically, two abutment portions 21 arranged side by side in the front-rear direction and a pair of bead-shaped portions 25 disposed in close vicinity to the respective abutment portions 21 are formed at the upper wall 12 of a tank main body T30a of a fuel tank T30 in a comparative example.

A front end portion 25a of the rear bead-shaped portion 25 and a rear end portion 25b of the front bead-shaped portion 25 are disposed in such a manner as to face each other. In the tank main body T30a, a region between the front end portion 25a of the rear bead-shaped portion 25 and the rear end portion 25b of the front bead-shaped portion 25 is an inner pinch generation concern region K3 where there is a concern of the inner pinch Q being generated. Specifically, the bead-shaped portions 25 (i.e., protruding portions of the mold corresponding to the bead-shaped portions 25) serve as starting points hindering the parison S from expanding, and the inner pinch Q is generated due to the same principle as the first embodiment.

Figure 12B:
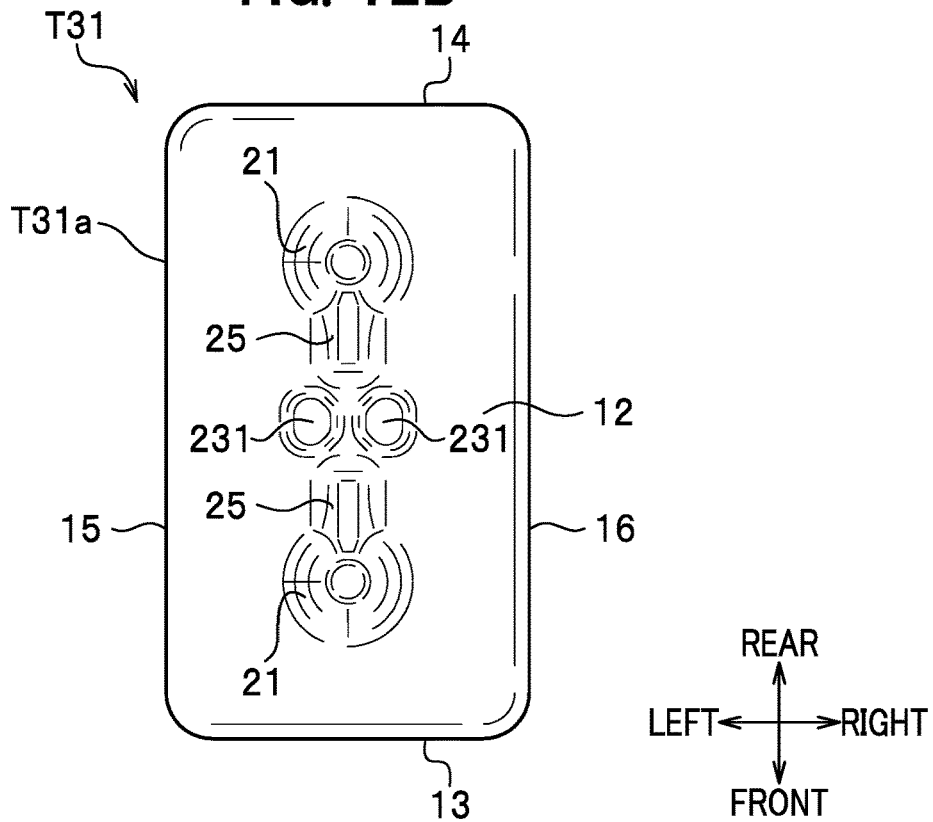
FIG. 12B is a plan view of a fuel tank according to the third embodiment.

As shown in FIG. 12B, in order to reduce generation of the inner pinch Q, a fuel tank T31 of the present embodiment is provided with inner pinch reducing recess portions 231 at both the right and left sides of the inner pinch generation concern region K3 (see FIG. 12A). The protrusion amount by which the inner pinch reducing recess portions 231 protrude into a tank main body T31a is smaller than the protrusion amount by which the bead-shaped portions 25 protrude. In other words, the depth of the inner pinch reducing recess portions 231 is shallower than the depth of the bead-shaped portions 25. Note that the inner pinch reducing recess portions 231 may be disposed at only one side of the inner pinch generation concern region K3, like in the modification of the first embodiment.

The fuel tank T31 according to the third embodiment described above offers the same advantageous effects as the fuel tank T11 according to the first embodiment.

<<Fuel Tank According to a Fourth Embodiment>>

Figure 13A:
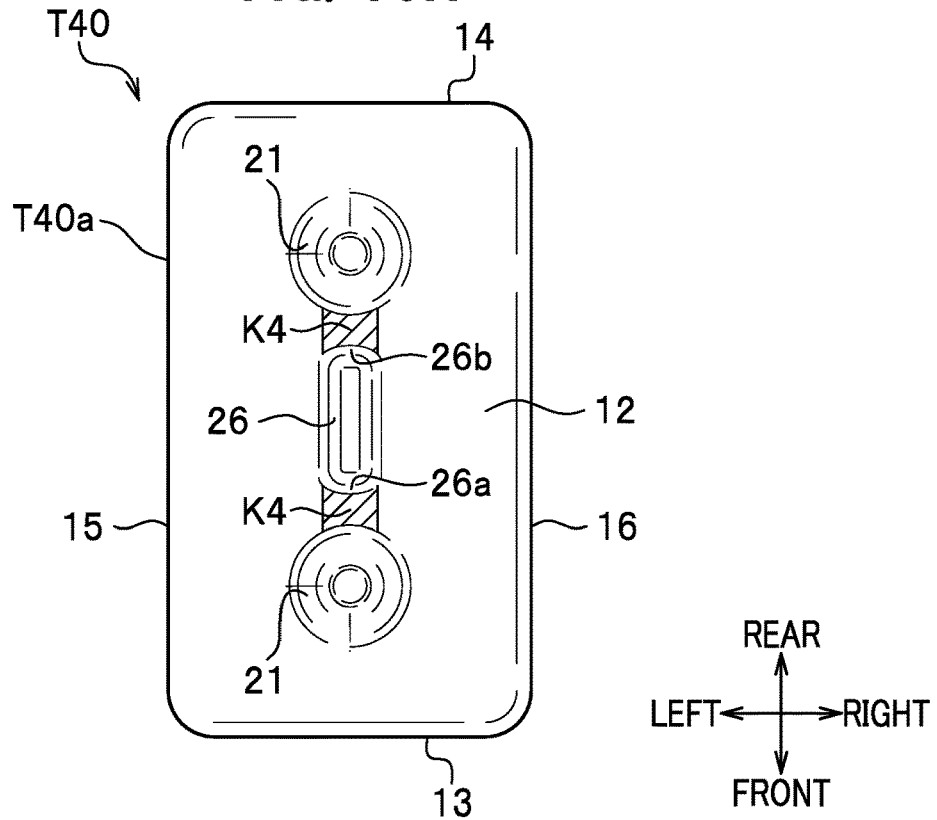
FIG. 13A is a plan view of a fuel tank of a comparative example for a fourth embodiment.

As the structure of a fuel tank in a comparative example, a fourth embodiment assumes the one shown in FIG. 13A. Specifically, two abutment portions 21 arranged side by side in the front-rear direction and a bead-shaped portion 26 disposed between the abutment portions 21 are formed at the upper wall 12 of a tank main body T40a of a fuel tank T40 in a comparative example.

A front end portion 26a of the bead-shaped portion 26 extends close to the front abutment portion 21, and a rear end portion 26b of the bead-shaped portion 26 extends close to the rear abutment portion 21. In the tank main body T40a, a region between the front end portion 26a of the bead-shaped portion 26 and the front abutment portion 21 and a region between the rear end portion 26b of the bead-shaped portion 26 and the rear abutment portion 21 are inner pinch generation concern regions K4 where there is a concern of the inner pinch Q being generated. Specifically, the bead-shaped portion 26 (i.e., a protruding portion of the mold corresponding to the bead-shaped portion 26) and the abutment portions 21 (i.e., protruding portions of the mold corresponding to the abutment portions 21) serve as starting points hindering the parison S from expanding. The inner pinch Q is generated due to the same principle as the first embodiment.

Figure 13B:
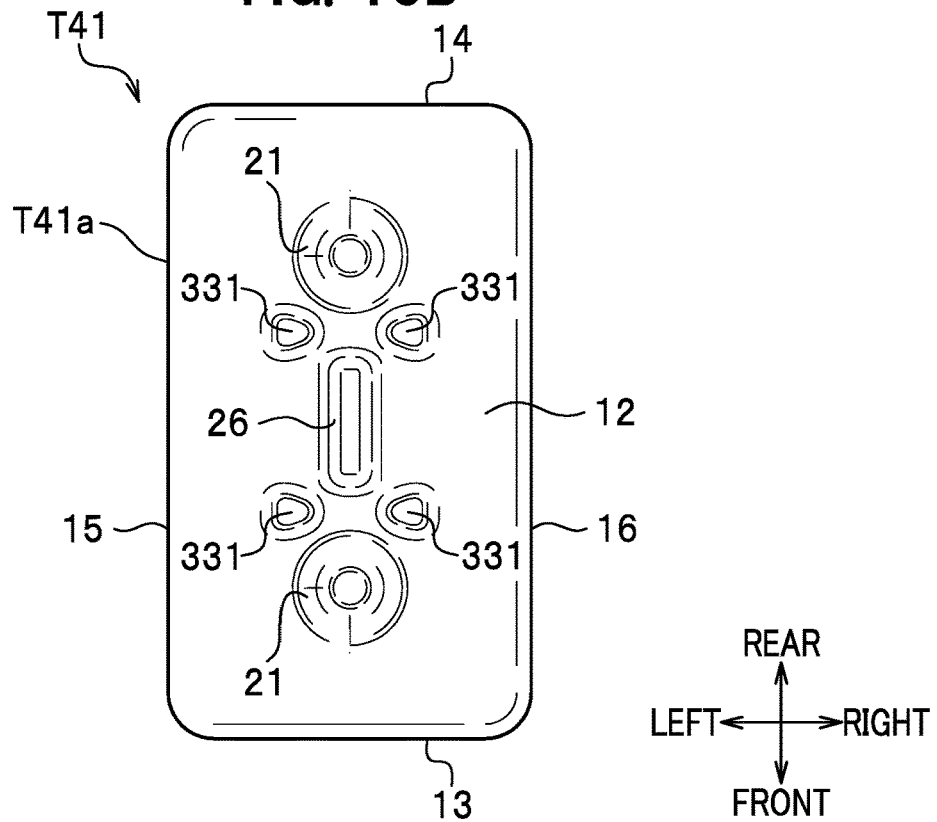
FIG. 13B is a plan view of a fuel tank according to the fourth embodiment.

As shown in FIG. 13B, in order to reduce generation of the inner pinch Q, a fuel tank T41 of the present embodiment is provided with inner pinch reducing recess portions 331 at both the right and left sides of each of the inner pinch generation concern regions K4 (see FIG. 13A). The protrusion amount by which the inner pinch reducing recess portions 331 protrude into a tank main body T41a is smaller than the protrusion amount by which the bead-shaped portion 26 or the recess portions 22, 23 of the abutment portions 21 protrude. In other words, the depth of the inner pinch reducing recess portions 331 is shallower than the depths of the bead-shaped portion 26 or the recess portions 22, 23 of the abutment portions 21. Note that the inner pinch reducing recess portions 331 may be disposed at only one side of the inner pinch generation concern regions K4, like in the modification of the first embodiment.

The fuel tank T41 according to the fourth embodiment described above offers the same advantageous effects as the fuel tank T11 according to the first embodiment.

<<Fuel Tank According to a Fifth Embodiment>>

Figure 14A:
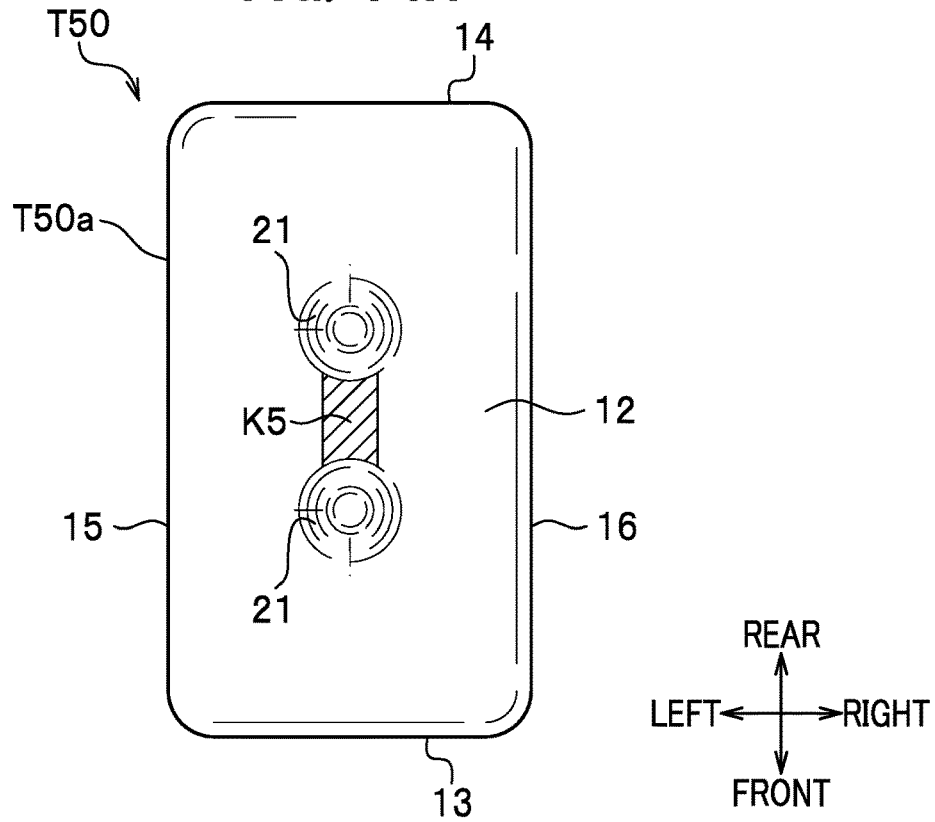
FIG. 14A is a plan view of a fuel tank of a comparative example for a fifth embodiment.

As the structure of a fuel tank in a comparative example, a fifth embodiment assumes the one shown in FIG. 14A. Specifically, two abutment portions 21 are formed at the upper wall 12 of a tank main body T50a of a fuel tank T50 as a comparative example, arranged side by side in the front-rear direction. The two abutment portions 21 are disposed with a short gap in between. In the tank main body T50a, a region between the two abutment portions 21 is an inner pinch generation concern region K5 where there is a concern of the inner pinch Q being generated. Specifically, the two abutment portions 21 (i.e., protruding portions of the mold corresponding to the abutment portions 21) serve as starting points hindering the parison S from expanding. The inner pinch Q is generated due to the same principle as the first embodiment.

Figure 14B:
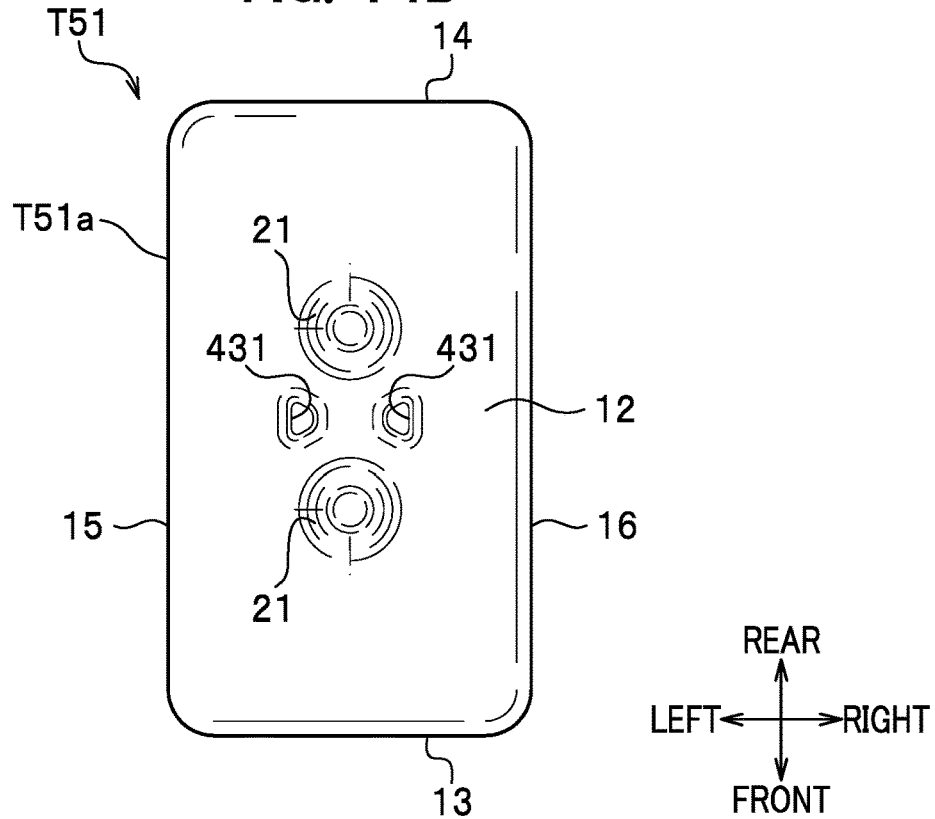
FIG. 14B is a plan view of a fuel tank according to the fifth embodiment.

As shown in FIG. 14B, in order to reduce generation of the inner pinch Q, a fuel tank T51 of the present embodiment is provided with inner pinch reducing recess portions 431 at both the right and left sides of the inner pinch generation concern region K5 (see FIG. 14A). The protrusion amount by which the inner pinch reducing recess portions 431 protrude into a tank main body T51a is smaller than the protrusion amount by which the recess portions 22, 23 of the abutment portions 21 protrude. In other words, the depth of the inner pinch reducing recess portions 431 is shallower than the depth of the recess portions 22, 23 of the abutment portions 21. Note that the inner pinch reducing recess portion 431 may be disposed at only one side of the inner pinch generation concern region K5, like in the modification of the first embodiment.

Figure 14C:
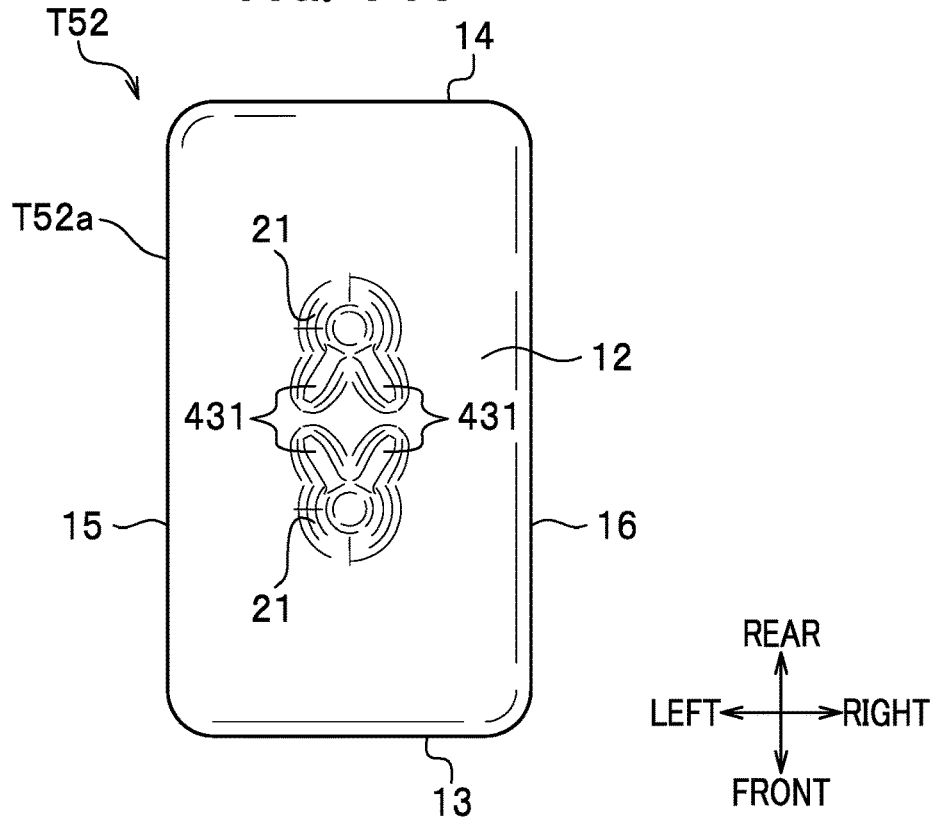
FIG. 14C is a plan view of a fuel tank according to a first modification of the fifth embodiment.

Also, like a fuel tank T52 (or a tank main body T52a) shown in FIG. 14C, the inner pinch reducing recess portions 431 may be disposed in such a manner as to partially overlap with the abutment portions 21. In FIG. 14C, each abutment portion 21 has two inner pinch reducing recess portions 431 overlapping therewith. The pair of inner pinch reducing recess portions 431 corresponding to each abutment portion 21 are disposed on the respective sides of the inner pinch generation concern region K5 (see FIG. 14A). Note that the inner pinch reducing recess portion 431 may be disposed at only one side of the inner pinch generation concern region K5.

Figure 14D:
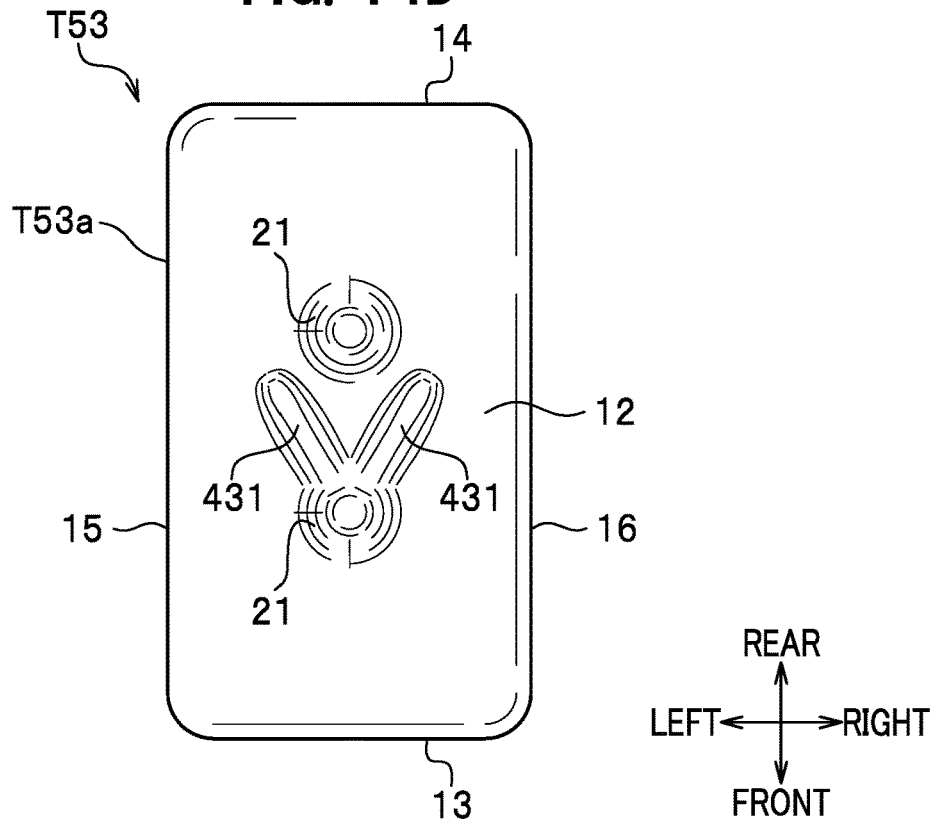
FIG. 14D is a plan view of a fuel tank according to a second modification of the fifth embodiment.
Figure 14E:
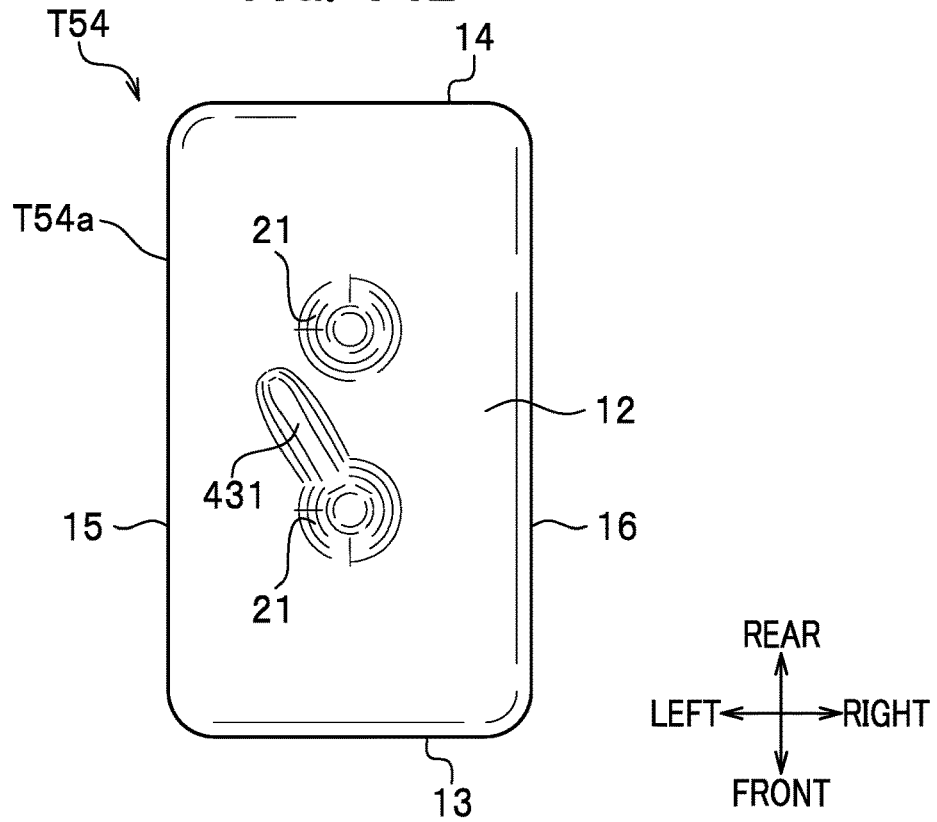
FIG. 14E is a plan view of a fuel tank according to a third modification of the fifth embodiment.
Figure 14F:
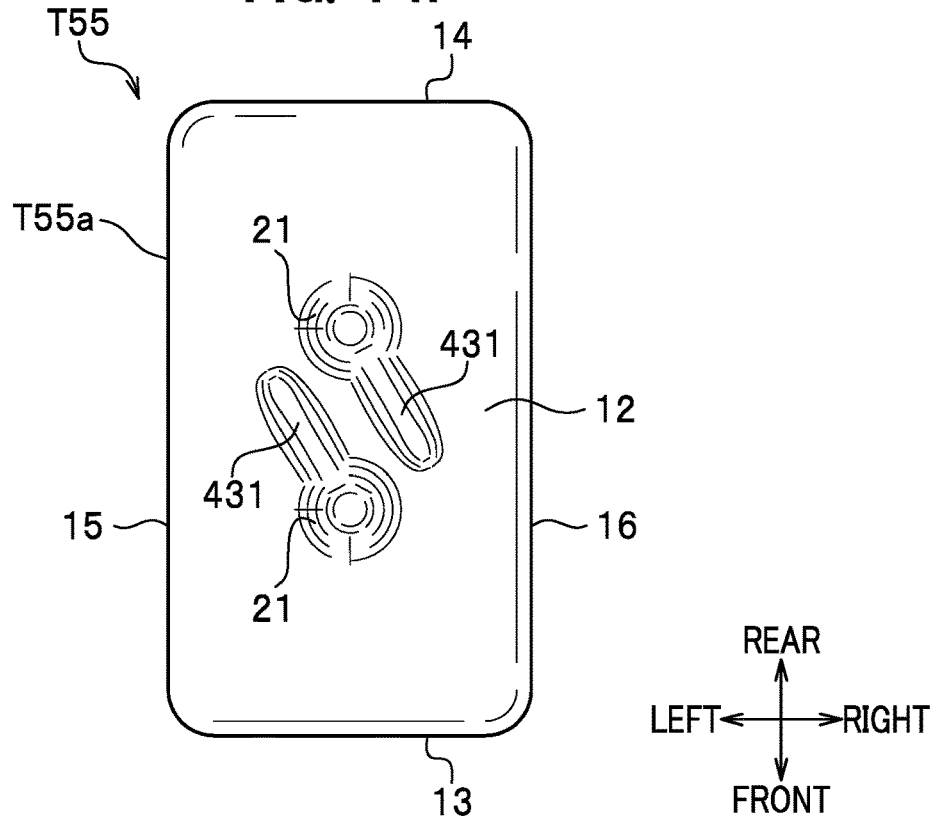
FIG. 14F is a plan view of a fuel tank according to a fourth modification of the fifth embodiment.

Also, like a fuel tank T53 (or a tank main body T53a) shown in FIG. 14D or a fuel tank T54 (or a tank main body T54a) shown in FIG. 14E, the inner pinch reducing recess portion 431 may be disposed only for one of the abutment portions 21. Also, like a fuel tank T55 (or a tank main body T55a) shown in FIG. 14F, one inner pinch reducing recess portion 431 may be disposed overlapping with each abutment portion 21. In FIG. 14F, the inner pinch reducing recess portion 431 corresponding to the front abutment portion 21 is disposed at the left side of the inner pinch generation concern region K5 (see FIG. 14A), and the inner pinch reducing recess portion 431 corresponding to the rear abutment portion 21 is disposed at the right side of the inner pinch generation concern region K5.

The fuel tanks T51 to T55 according to the fifth embodiment described above offer the same advantageous effects as the fuel tank T11 according to the first embodiment.

<<Fuel Tank According to a Sixth Embodiment>>

Figure 15A:
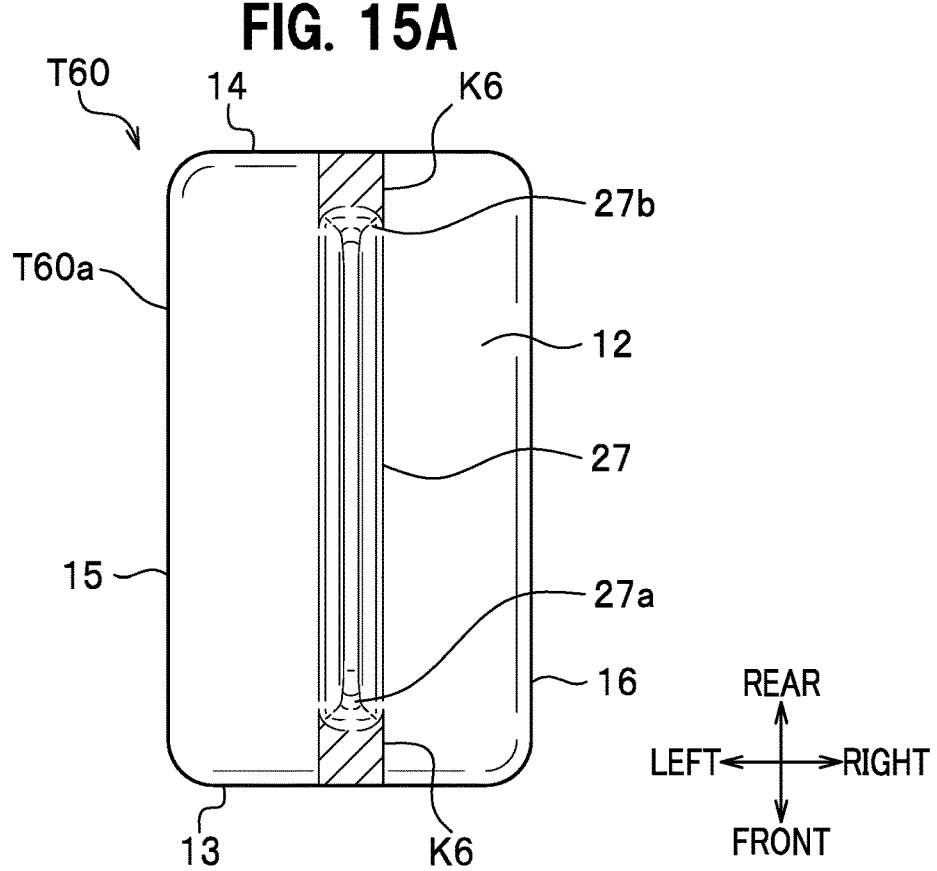
FIG. 15A is a plan view of a fuel tank of a comparative example for a sixth embodiment.

As the structure of a fuel tank in a comparative example, a sixth embodiment assumes the one shown in FIG. 15A. Specifically, a bead-shaped portion 27 is formed at the upper wall 12 of a tank main body T60a of a fuel tank T60 in a comparative example, extending in the front-rear direction.

The bead-shaped portion 27 is a portion formed by recessing the wall portion linearly and is shaped like a groove. The bead-shaped portion 27 may include a curved part. The tip end of the bead-shaped portion 27 is not in contact with the lower wall 11. A front end portion 27a of the bead-shaped portion 27 extends close to the first sidewall 13 at the front, and a rear end portion 27b thereof extends close to the second sidewall 14 at the rear. In the tank main body T60a, a region between the front end portion 27a of the bead-shaped portion 27 and the first sidewall 13 and a region between the rear end portion 27b and the second sidewall 14 are inner pinch generation concern regions K6, K6 where there is a concern of the inner pinch Q being generated. Specifically, the bead-shaped portion 27 (a protruding portion of the mold corresponding to the bead-shaped portion 27) serves as a starting point hindering the parison S from expanding, and the inner pinch Q is generated due to the same principle as the first embodiment.

Figure 15B:
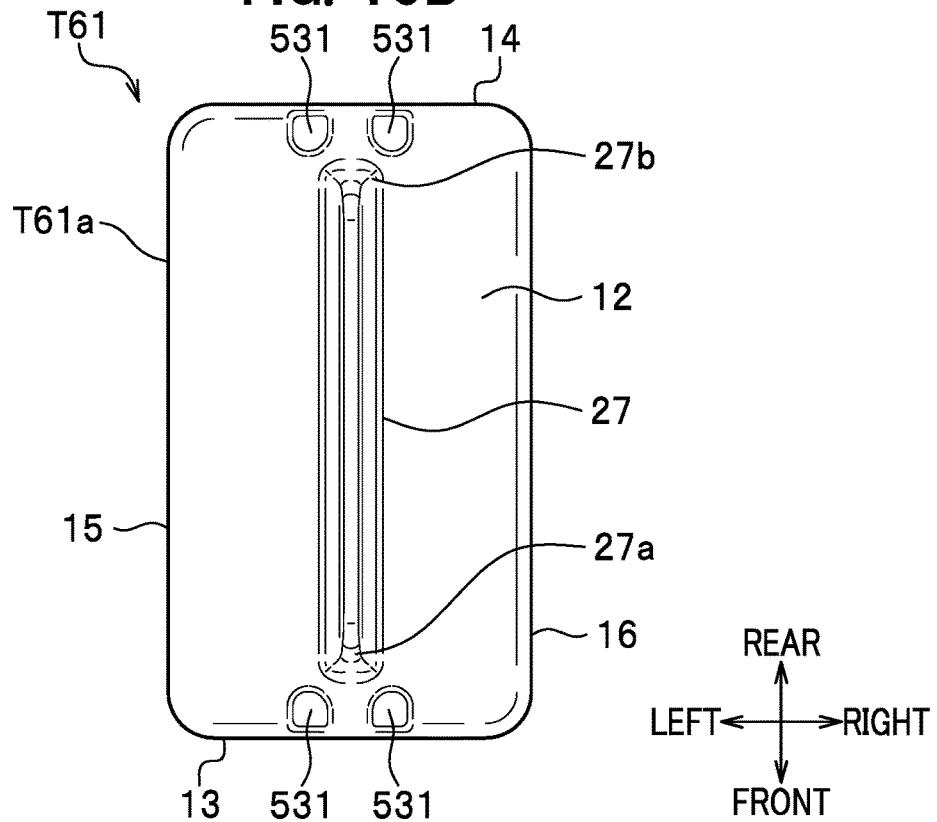
FIG. 15B is a plan view of a fuel tank according to the sixth embodiment.

As shown in FIG. 15B, in order to reduce generation of the inner pinch Q, a fuel tank T61 of the present embodiment is provided with inner pinch reducing recess portions 531, 531 at both the right and left sides of each of the inner pinch generation concern regions K6 (see FIG. 15A). The protrusion amount by which the inner pinch reducing recess portions 531 protrude into a tank main body T61a is smaller than the protrusion amount by which the bead-shaped portion 27 protrudes. In other words, the depth of the inner pinch reducing recess portions 531 is shallower than the depth of the bead-shaped portion 27. Note that the inner pinch reducing recess portions 531 may be disposed at only one side of the inner pinch generation concern regions K6, like in the modification of the first embodiment.

The fuel tank T61 according to the sixth embodiment described above offers the same advantageous effects as the fuel tank T11 according to the first embodiment.

Although embodiments of the invention and their modifications have been described above, they can be modified in design as needed as long as they do not contradict the gist of the present invention.

For example, although the inner pinch reducing recess portions 31, 131, 231, 331, 431, 531 are provided at the upper wall 12 of the tank main body in each embodiment, the inner pinch reducing recess portions 31, 131, 231, 331, 431, 531 may be provided at the lower wall 11 instead of or in addition to the upper wall 12.

Also, although the embodiments show the recess portions 22, 23 forming the abutment portion 21 and the bead-shaped portion 24, 25, 26, 27 as an example of the recess-shaped portion, the recess-shaped portion may be in other shapes.

REFERENCE SIGNS LIST

T11 fuel tank
T11a tank main body
11 lower wall (or wall portion)
12 upper wall (or wall portion)
13 first sidewall (or upstanding wall, wall portion)
14 second sidewall (or upstanding wall, wall portion)
15 third sidewall (or upstanding wall, wall portion)
16 fourth sidewall (or upstanding wall, wall portion)
21 abutment portion
22, 23 recess portion (or recess-shaped portion)
24, 25, 26, 27 bead-shaped portion (or recess-shaped portion)
31, 131, 231, 331, 431, 531 inner pinch reducing recess portion
2, 3, 902, 903 mold
2a, 3a, 902a, 903a mold surface
2j, 3j abutment mold portion
2k inner pinch reducing bump portion
K1, K2, K3, K4, K5, K6 inner pinch generation concern region
S parison
Q inner pinch

The invention claimed is:

1. A fuel tank having a recess-shaped portion formed continuously from a tank main body and protruding inward, the fuel tank including:
   an inner pinch reducing recess portion being disposed on one side or an other side of an inner pinch generation concern region, or a plurality of inner pinch reducing recess portions being respectively disposed on one of the one side and the other side of the inner pinch generation concern region where there is a concern of an inner pinch being generated when molding between the recess-shaped portion and an upstanding wall of the tank main body or between two of the recess-shaped portions, wherein
   the inner pinch reducing recess portion is separated from the recess-shaped portion,
   the tank main body is a rectangular cube and includes:
      an upper wall that is flat and extends in a first direction and a second direction;
      a lower wall that is flat, the lower wall is spaced away from and parallel to the flat upper wall; and
      a plurality of sidewalls that are flat, each of the sidewalls is connected to and extends from each of the upper wall and the lower wall,
   the inner pinch generation concern region is a predetermined area of at least one of the upper wall and the lower wall, the inner pinch generation concern region has a predetermined alignment with the recess-shaped portion in the first direction and the second direction,
   the inner pinch reducing recess portion extends along at least one of the upper wall and the lower wall and overlaps at least a portion of the inner pinch generation concern region,
   the recess-shaped portion protrudes toward the upper wall or the lower wall in a depth direction that is orthogonal to the first direction and the second direction, the recess-shaped portion protrudes in the depth direction to a first depth, and
   the inner pinch reducing portion protrudes toward the upper wall or the lower wall in the depth direction to a second depth that is less than the first depth.

2. The fuel tank according to claim 1, wherein
   the recess-shaped portion is a recess portion forming an abutment portion formed by recessing facing wall portions and joining bottom portions thereof to each other, or a bead-shaped portion formed with an intention of wave dissipation or deformation reduction.

3. The fuel tank according to claim 2, wherein
   the inner pinch reducing recess portions are disposed at only one of the one side and the other side of the inner pinch generation concern region.

4. The fuel tank according to claim 1, wherein
the inner pinch reducing recess portions are disposed at only one of the one side and the other side of the inner pinch generation concern region.

* * * * *